(12) United States Patent
McMahon et al.

(10) Patent No.: US 11,109,091 B2
(45) Date of Patent: *Aug. 31, 2021

(54) INTELLIGENT REMOTE CONTROL

(71) Applicant: Comcast Cable Communications, LLC, Philadelphia, PA (US)

(72) Inventors: Michael D. McMahon, Centennial, CO (US); Donald Dischner, Elizabeth, CO (US); Jamesheed R. Batmanglidj, Littleton, CO (US); James Capps, Lakewood, CO (US); Joshua Seiden, Englewood, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/387,030

(22) Filed: Apr. 17, 2019

(65) Prior Publication Data

US 2020/0084496 A1 Mar. 12, 2020

Related U.S. Application Data

(63) Continuation of application No. 15/642,043, filed on Jul. 5, 2017, now Pat. No. 10,313,732, which is a
(Continued)

(51) Int. Cl.
*H04N 21/41* (2011.01)
*H04N 21/4227* (2011.01)
(Continued)

(52) U.S. Cl.
CPC ......... *H04N 21/4227* (2013.01); *H04N 21/41* (2013.01); *H04N 21/4113* (2013.01);
(Continued)

(58) Field of Classification Search
CPC .......... H04N 21/4108; H04N 21/4113; H04N 21/4126; H04N 21/4403; H04N 21/4442;
(Continued)

(56) References Cited

U.S. PATENT DOCUMENTS 6,097,441 A 8/2000 Allport
6,175,922 B1 1/2001 Wang
(Continued)

FOREIGN PATENT DOCUMENTS

EP 1686503 A1 8/2006
EP 2093983 A1 8/2009
(Continued)

OTHER PUBLICATIONS

Examination Report EP11165554.4, dated Jun. 27, 2012.
(Continued)

*Primary Examiner* — Van T Trieu
(74) *Attorney, Agent, or Firm* — Banner & Witcoff, Ltd.

(57) ABSTRACT

A content access device and system may allow portable remote devices to be paired with a variety of different devices, allowing remote control through a network connection. Content access devices may expose application program interfaces, allowing incoming network traffic to control operation of the device much in the same way that a local infrared remote would. Routing content commands through an external application server may also yield other benefits, such as allowing more customized selection of information and advertising content to users based on their viewing history.

36 Claims, 19 Drawing Sheets

Related U.S. Application Data continuation of application No. 15/017,893, filed on Feb. 8, 2016, now Pat. No. 9,736,525, which is a continuation of application No. 13/103,574, filed on May 9, 2011, now Pat. No. 9,294,800.

(60) Provisional application No. 61/333,066, filed on May 10, 2010.

(51) Int. Cl.
*H04W 12/08* (2021.01)
*H04N 21/4147* (2011.01)
*H04N 21/6334* (2011.01)

(52) U.S. Cl.
CPC ..... *H04N 21/4126* (2013.01); *G08C 2201/40* (2013.01); *G08C 2201/41* (2013.01); *G08C 2201/93* (2013.01); *H04N 21/4108* (2013.01); *H04N 21/4147* (2013.01); *H04N 21/6334* (2013.01); *H04W 12/08* (2013.01)

(58) Field of Classification Search
CPC ............... H04N 21/4444; H04N 21/45; H04N 21/4508; H04N 21/4532; H04N 21/41; H04N 21/4227; H04L 12/66; G08C 2201/40; G08C 2201/90; G06F 15/16
See application file for complete search history.

(56) References Cited

U.S. PATENT DOCUMENTS

| | | | |
|---|---|---|---|
| 6,256,019 B1 | 7/2001 | Allport | |
| 6,378,130 B1 | 4/2002 | Adams | |
| 6,476,825 B1 | 11/2002 | Croy et al. | |
| 6,813,619 B2 | 11/2004 | Devara | |
| 6,975,836 B2 | 12/2005 | Tashiro et al. | |
| 7,181,010 B2 | 2/2007 | Russ et al. | |
| 7,194,758 B1 | 3/2007 | Waki et al. | |
| 7,281,261 B2 | 10/2007 | Jaff et al. | |
| 7,296,284 B1 | 11/2007 | Price et al. | |
| 7,505,592 B2 | 3/2009 | Russ et al. | |
| 7,860,250 B2 | 12/2010 | Russ et al. | |
| 7,904,074 B2 | 3/2011 | Karaoguz et al. | |
| 7,950,037 B2 | 5/2011 | Mensch | |
| 7,953,255 B2 | 5/2011 | Amento et al. | |
| 8,126,449 B2 | 2/2012 | Beenau et al. | |
| 8,412,839 B2* | 4/2013 | Harris | H04L 63/08 455/418 |
| 9,049,477 B2 | 6/2015 | Liu et al. | |
| 2002/0083455 A1 | 6/2002 | Sato | |
| 2002/0131444 A1 | 9/2002 | Moodie et al. | |
| 2002/0174360 A1 | 11/2002 | Ikeda | |
| 2003/0003899 A1 | 1/2003 | Tashiro et al. | |
| 2003/0050062 A1 | 3/2003 | Chen et al. | |
| 2003/0066092 A1 | 4/2003 | Wagner et al. | |
| 2005/0028208 A1 | 2/2005 | Ellis et al. | |
| 2005/0251823 A1 | 11/2005 | Saarikivi | |
| 2005/0262542 A1* | 11/2005 | DeWeese | H04L 12/1818 725/106 |
| 2006/0112343 A1 | 5/2006 | Ducheneaut et al. | |
| 2006/0205410 A1 | 9/2006 | Black | |
| 2007/0136767 A1 | 6/2007 | Choi et al. | |
| 2007/0237316 A1* | 10/2007 | Tanabe | H04L 12/2818 379/102.03 |
| 2008/0141313 A1 | 6/2008 | Kato et al. | |
| 2008/0168525 A1 | 7/2008 | Heller et al. | |
| 2008/0201754 A1* | 8/2008 | Arling | H04L 12/2805 725/114 |
| 2009/0019141 A1* | 1/2009 | Bush | H04L 12/2807 709/223 |
| 2009/0021474 A1 | 1/2009 | Bentley et al. | |
| 2009/0293079 A1 | 11/2009 | McKee et al. | |
| 2010/0017736 A1 | 1/2010 | Kim | |
| 2010/0169917 A1 | 7/2010 | Harboe et al. | |
| 2010/0217837 A1 | 8/2010 | Ansari et al. | |
| 2010/0330979 A1 | 12/2010 | Harris | |
| 2011/0078717 A1 | 3/2011 | Drummond et al. | |
| 2011/0126258 A1 | 5/2011 | Emerson et al. | |
| 2011/0202603 A1 | 8/2011 | Mate et al. | |
| 2011/0273625 A1 | 11/2011 | McMahon et al. | |

FOREIGN PATENT DOCUMENTS

| | | |
|---|---|---|
| GB | 2 403 577 A | 1/2005 |
| WO | 2009114247 A2 | 9/2009 |
| WO | 20110008387 A2 | 1/2011 |
| WO | 20110041138 A1 | 4/2011 |

OTHER PUBLICATIONS

Extended European Search Report, European Application No. 11165554.4, dated Nov. 15, 2011.
Partial European Search Report, European Application No. 11165554.4, dated Jul. 22, 2011.
Saxena et al., "Secure Device Pairing based on a Visual Channel (Short Paper)," IEEE Transactions on Information Forensics and Security, vol. 6, No. 1, Mar. 2011.
Patent Cooperation Treaty International Search Report and Written Opinion for related application PCT/US06/06504, dated Feb. 27, 2007, 9 pages.
Canadian Office Action—CA 2,600,313—dated Apr. 23, 2015.
EP Examination Report 11165554.4, dated Nov. 23, 2016.
Aug. 29, 2018—Canadian Office Action—CA 2,739,283.

* cited by examiner

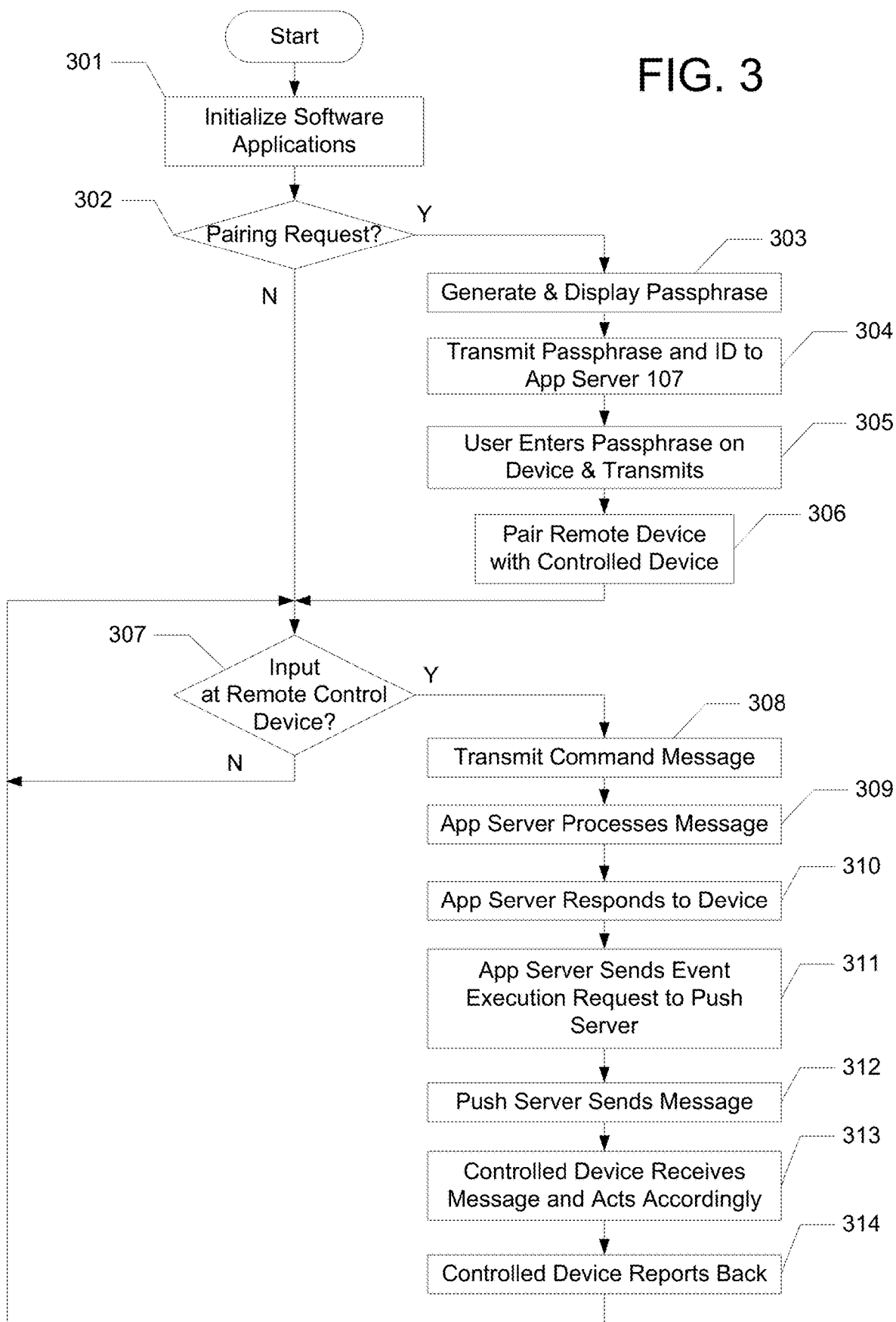

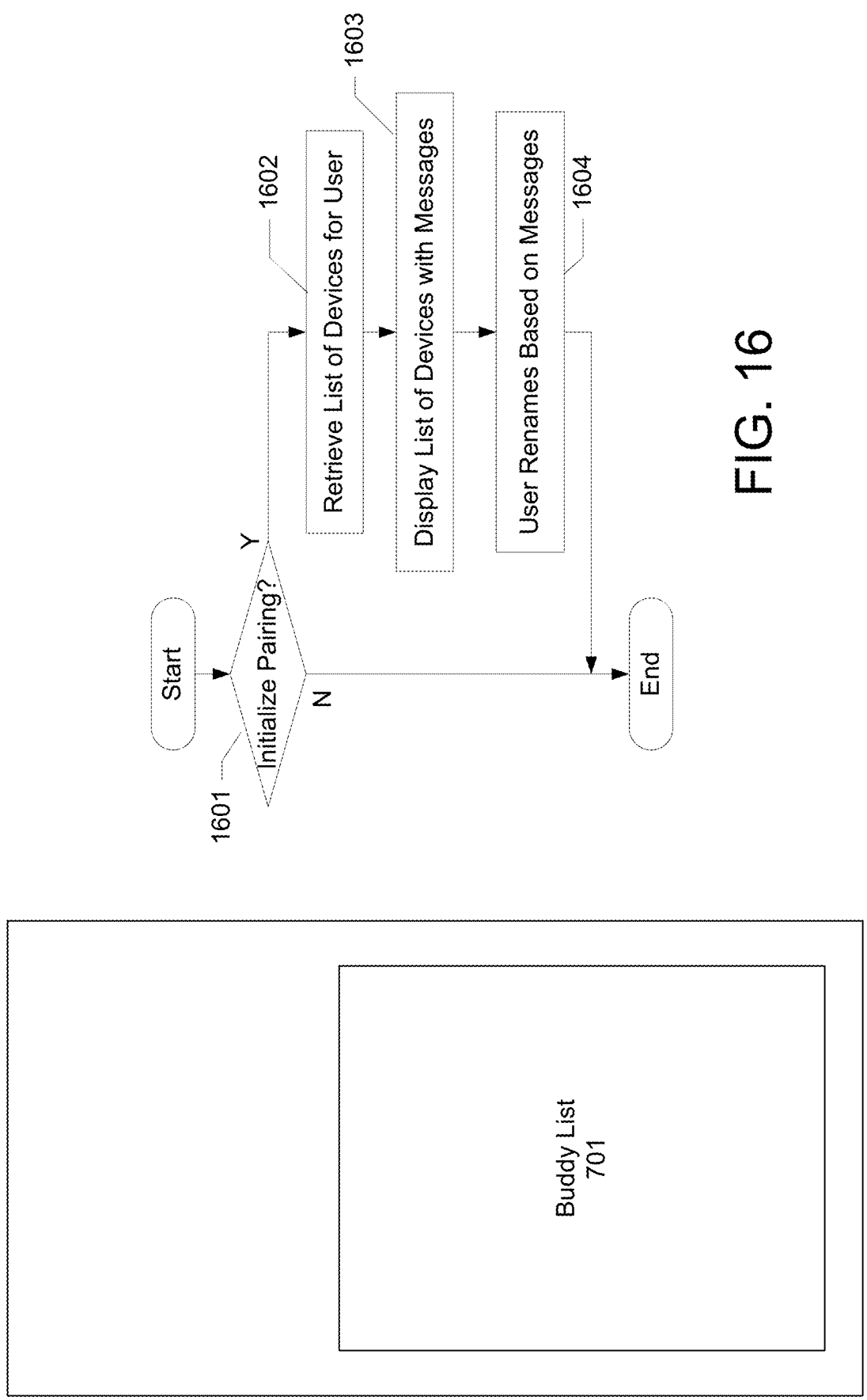

FIG. 8

My Remote – Register Device

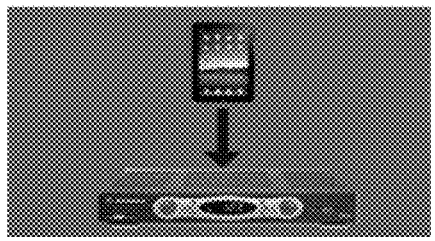

Step 1 – Generate Passphrase
Your Pass Phrase is:

Step 2 – Register Device

Enabling Your My Remote application is easy. Step 1 is to generate a unique Pass Phrase. This phrase is used to pair your remote with your device and is valid for 30 minutes.

My Remote – Register Device

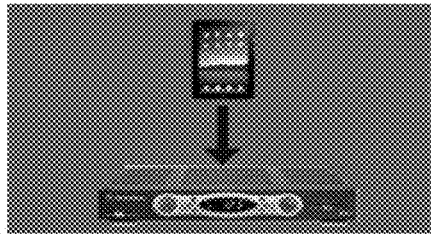

Step 1 – Generate Passphrase
Your Pass Phrase is: ZL2SP4

Step 2 – Register Device

Step 2 is to register your device. This will pair your device with the unique Pass Phrase generated in Step 1.

My Remote

| Home | Guide | VOD | Favs | Prefs | For You |

1301 — Choose STB under Control

Dev STB

1302 — Register a new STB

Pass Phrase [                    ]

Nick Name [                    ]

Add STB

1303 — STB Messaging

AMR IP [172.175.123.2323]

Schema IP [172.175.123.2323]

Social Viewing

Screen Name [jamie]

Cell Phone [555.555.5555]

Refresh App

FIG. 13

INTELLIGENT REMOTE CONTROL

CROSS-REFERENCE TO RELATED APPLICATIONS

This patent is a continuation of U.S. application Ser. No. 15/017,893, entitled "Intelligent Remote Control" and filed on Feb. 8, 2016, now U.S. Pat. No. 9,736,525, which is a continuation of U.S. application Ser. No. 13/103,574, entitled "Intelligent Remote Control" and filed on May 9, 2011, now U.S. Pat. No. 9,294,800, which claims the benefit of U.S. Provisional Application Ser. No. 61/333,066, entitled "Intelligent Remote Control" and filed on May 10, 2010. U.S. application Ser. No. 15/017,893, U.S. application Ser. No. 13/103,574, and U.S. Provisional Application Ser. No. 61/333,066 are hereby incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Television viewers have grown accustomed to the ubiquitous remote control. With it, a viewer can change the channel, adjust the volume, and power on/off their television. More modern remote controls have increased the functionality, to allow the remote controls to control other devices in the home. For example, a "universal" remote can control both a VCR and a television. The introduction of the digital video recorder (DVR) added a new level of functionality to the remote control, and viewers are now able to record, pause, and rewind television programs at their whim.

Despite the usefulness and convenience of conventional remote controls, there remains an ever-present need for even more convenience and even more usefulness.

SUMMARY

The features described herein generally relate to allowing network-based remote control of a user's device to access content. In some embodiments, a user may use a networked remote device, such as an Internet Protocol-enabled mobile device, to interact with a web server that offers control options for a user's controlled device, such as a set-top box (STB), digital video recorder (DVR), display device, television, or any other computing device used by the user to consume content. Through the web server, the user may pair his/her remote device with the controlled device that is to be controlled, and then enter control commands via the web server. The web server may receive commands via, for example, a web page, or alternatively via an exposed API, and can prepare corresponding commands to control the user's controlled device. The user may then remotely control their controlled device using, for example, their Internet-enabled cellular telephone. The user's controlled device may be configured to execute an application to receive such Internet-originated commands, forming a software control plane with the server.

An application server may receive the web-based commands, and may use the commands to offer enhanced services and information to the user. For example, social networking options may be provided to the user in connection with the program the user is watching. Usage data can also be collected at the application server, and used to provide targeted information (e.g., advertisements, television show recommendations, etc.) to the user based on demographic information.

Routing content access commands, such as channel tuning and program selection commands, through an external application server may allow further functionality as well. For example, the application server may use the information to support social viewing experiences. A user can send an invitation to a friend, inviting the friend to join in watching a currently-watched program, and accepting the invitation can result in the friend's access device automatically tuning to the same program. The two can then engage in an online chat while viewing the same program.

This summary is not intended to identify critical or essential features of the disclosures herein, but instead merely summarizes certain features and variations thereof.

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

FIG. 3 illustrates an example flow for an intelligent remote control.

FIGS. 4-9c illustrate various remote control application displays in accordance with some embodiments.

FIGS. 10a & b illustrate example pairing screens.

FIGS. 11-15 illustrate additional example remote control application screens.

FIG. 16 illustrates an example pairing flow.

DETAILED DESCRIPTION

Figure 1:
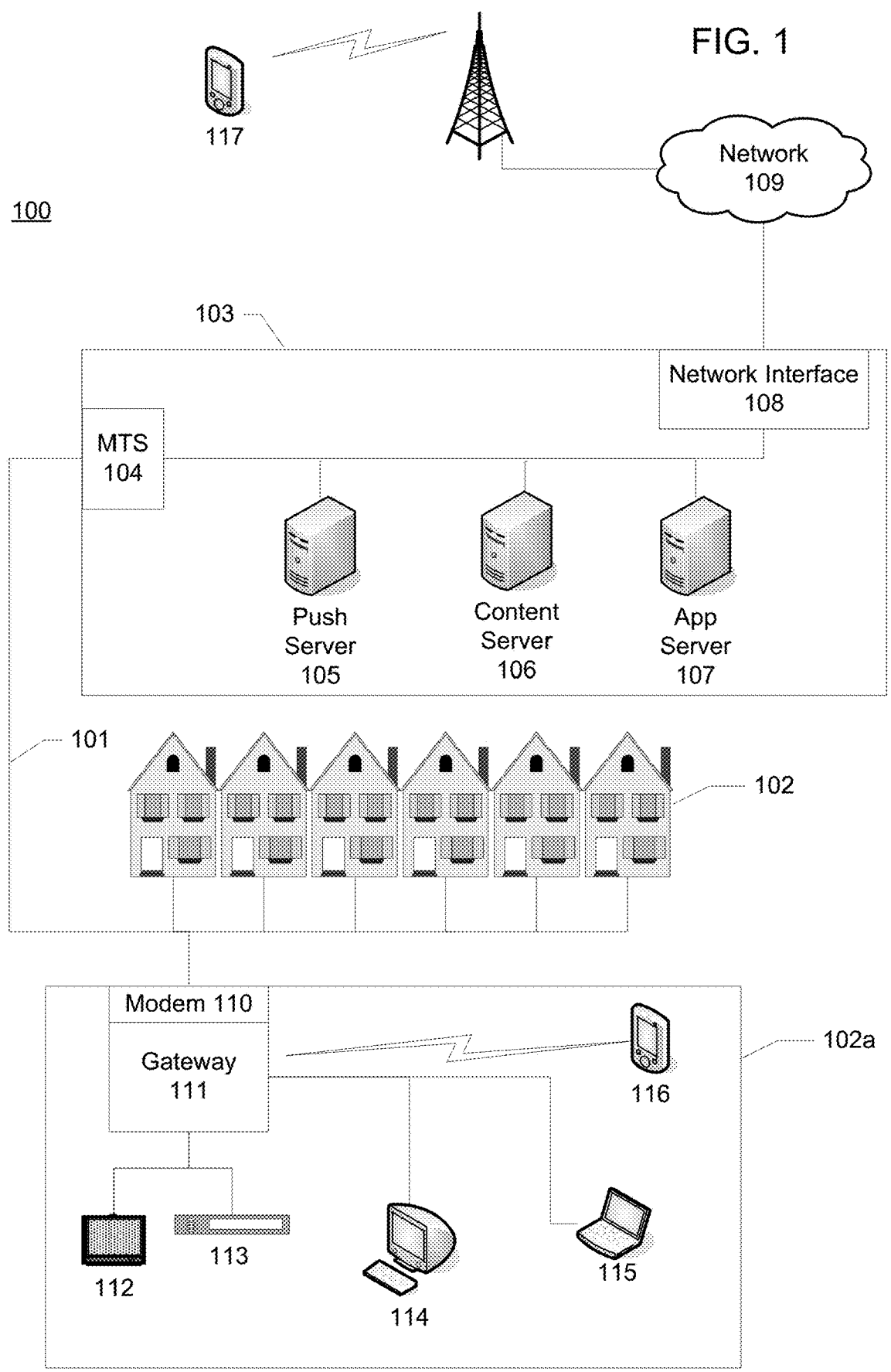
FIG. 1 illustrates an example information distribution network.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax (HFC) network. Such networks 100 use a series of interconnected communication lines 101 (e.g., coaxial cables, optical fibers, wireless, etc.) to connect multiple homes 102 to a central office or headend 103. The central office 103 may transmit downstream information signals onto the lines 101, and each home 102 may have a receiver used to receive and process those signals.

There may be one line 101 originating from the central office 103, and it may be split a number of times to distribute the signal to various homes 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths.

The central office 103 may include a termination system (TS) 104, such as a cable modem termination system (CMTS), which may be a computing device configured to manage communications between devices on the network of lines 101 and backend devices such as servers 105-107 (to be discussed further below). The TS may be as specified in a standard, such as the Data Over Cable Service Interface Specification (DOCSIS) standard, published by Cable Television Laboratories, Inc. (a.k.a. CableLabs) for HFC-type networks, or it may be a similar or modified device instead. The TS may be configured to place data on one or more downstream frequencies to be received by modems at the various homes 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand content, data, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. Other application servers 107 may be used for billing, entitlements, voice over Internet Protocol handling, single sign-on, and any other desired feature. And as will be discussed in greater detail below, another application server may be responsible for receiving user remote control commands, and processing them to provide an intelligent remote control experience.

An example home 102a may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others. Some devices, such as wireless devices 116, may be used as a user's remote control device, described further below. These devices may also be external remote control devices 117, usable outside of the user's home 102.

Figure 2:
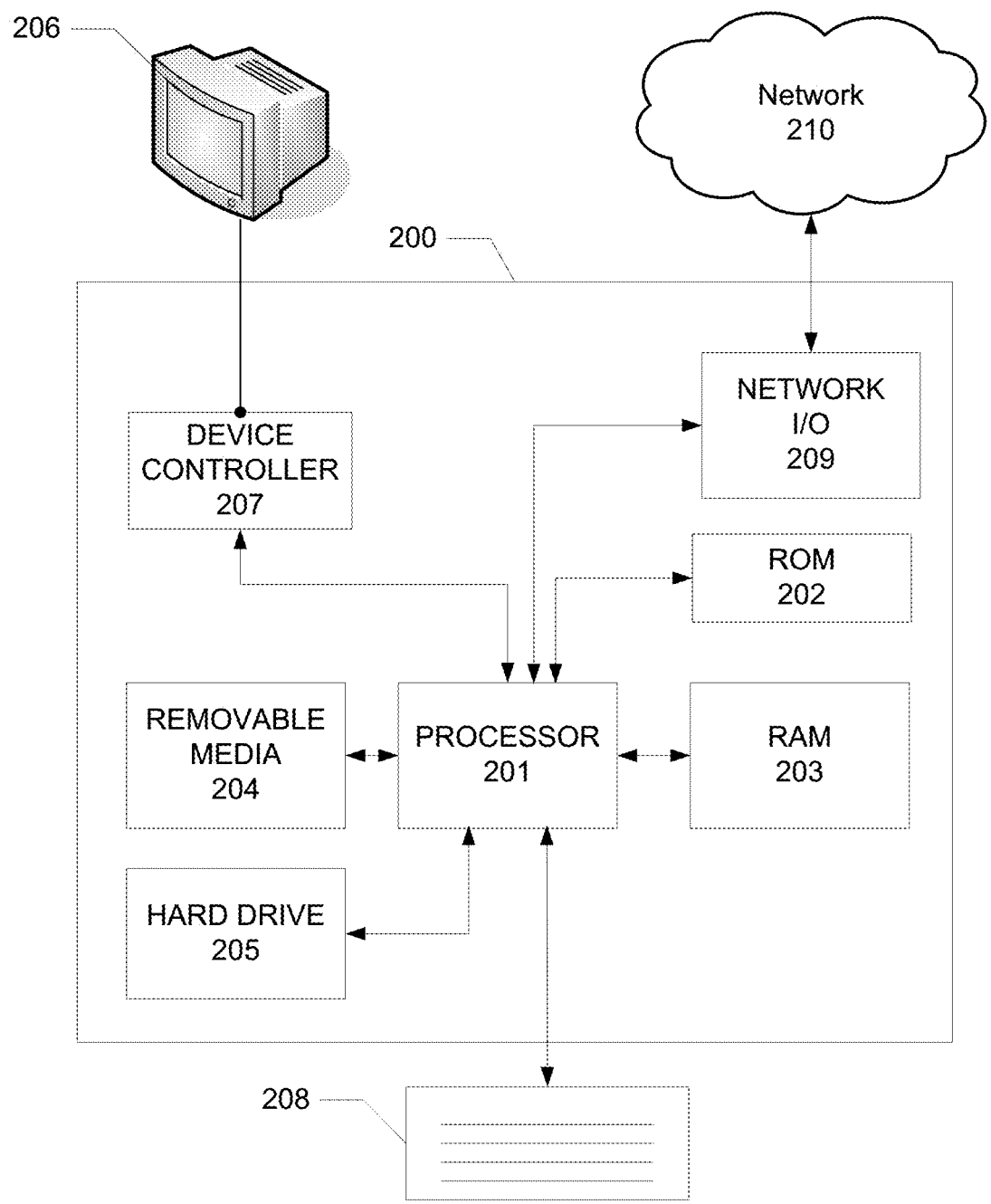
FIG. 2 illustrates an example hardware platform on which the various elements described herein can be implemented.

FIG. 2 illustrates general hardware (some of which can be implemented in software as well) elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Various features described herein offer improved remote control functionality to users accessing content from the central office 103. For example, one such user may be a viewer who is watching a television program being transmitted from the central office 103. In some embodiments, the user may be able to control his/her viewing experience (e.g., changing channels, adjusting volume, viewing a program guide, etc.) using any networked device, such as a cellular telephone, personal computer, personal data assistant (PDA), netbook computer, etc., aside from (or in addition to) the traditional infrared remote control that may have been supplied together with a television or STB.

FIG. 3 illustrates a general example of how such an intelligent remote control experience may be implemented, with steps that may be performed at various places in the overall network 100. Beginning in step 301, one or more software applications may be initialized for operation. This initialization may involve loading and/or running software onto various computing devices, such as a user's remote control device (e.g., wireless device 116, computer 114, external wireless device 117, etc.), an application server 107, or the user's controlled device (e.g., the gateway 111, STB 113 and/or television 112 (or another display device or content access device)). One example application loaded on the application server 107 may include application program interfaces (APIs) that expose certain commands the user's remote control device, which the remote control device can use to request that the application server 107 send a corresponding command to the user's controlled device. The table below illustrates an example listing of commands (e.g., code received in an EBIF (Enhanced Television Binary Interchange Format) message) that can be exposed by the API, along with their function (e.g., name of a software routine to be executed by the application server 107 when the enumerated command is received) and parameters (e.g., data values to be passed to/from the executed routine):

| Command Code | Function | Parameters |
|---|---|---|
| 1 | Channel Tune | Channel Source ID |
| 2 | VOD Telescope | ProviderID, AssetID |
| 3 | DVR Record | Source ID, Start Time |
| 4 | DVR Series Record | Source ID, Start Time, Series ID |
| 5 | Basic Message | Payload |
| 6 | Instantiate App | Payload, App ID |
| 7 | Executable Message | Message Payload |

The Channel Tune routine may, for example, cause the application server 107 to instruct the controlled device (e.g., gateway 111, STB/DVR 113, content consuming computer 114, or whichever device is to be controlled) to tune to a channel or service identified by the Channel Source ID. For example, the Channel Tune function can be used to instruct the controlled device to tune to Home Box Office (HBO), and the controlled device may respond by changing channel to HBO. The controlled device's response may follow the same approach as if the user had requested HBO from the gateway 111 or STB/DVR 113's program guide, or entered channel numbers using a local infrared remote.

The VOD (video on demand) Telescope routine may cause application server 107 to begin a video on demand stream containing the identified asset from the identified provider, and to instruct a user's controlled device to tune to that stream.

The DVR Record routine may cause the application server 107 to instruct the controlled device to schedule a recording of an identified source (e.g., channel, service, stream, etc.) at the identified time. This may result in, for example, the DVR 113 setting a future recording schedule.

The DVR Series Record routine may cause the application server 107 to instruct the controlled device to schedule a recording of each episode of an identified program series from an identified source to begin at the identified time.

The Basic Message routine may cause the application server 107 to instruct the controlled device to generate an onscreen display on a connected display device (e.g., television) of a message in the payload.

The Instantiate App routine may cause the controlled device to begin executing an identified application. For example, if the user is bidding in an online auction and is outbid, the user's controlled device (e.g., a gateway 111 or STB/DVR 113) may receive a message containing an interactive Payload message for display ("You've been outbid for item XX, press [Auction] to view your auctions page."), and an identification of an application (which can be resident on the gateway) that should be executed by the controlled device. This application can be a 3rd party application that need not even be running on the user's remote device 116 that issued the Instantiate App command.

The Executable Message routine may cause the application server 107 to instruct the controlled device to display an interactive message. This message may be a pop-up message with one or more interactive buttons, and a prompt. For example, the pop-up message may notify the user that a particular program is available for recording or video on demand, with buttons that would set a DVR recording or initiate a video on demand streaming session (e.g., "Lost series premier is on Tuesday, would you like to record?", or "Spiderman 3 is available now on demand, would you like to watch?"). The Executable Message routine may be similar to the Instantiate App routine, but can simply execute a native application that may be available on the user's remote control device (e.g., 116 or 117) as well.

The commands listed above are merely exemplary, and other commands may be used as well. For example, commands for other remote control commands mentioned above (e.g., numeric entry, rewind, fast-forward, pause, mute, directional navigation, menu, etc.) may also be implemented with their own commands.

In addition to initializing a command application on the application server 107, the step 301 initialization may also include installing (or initializing) a listener application on the controlled device, such as the gateway 111 or STB/DVR 113, television 112 (or whatever device is to be controlled). The listener application may be an unbound EBIF application, existing independent of the particular channel or service being currently tuned by the user's controlled device, and may be configured to receive commands from, for example, an application server 107 at the central office 103, to control various aspects of itself, such as channel tuning, recording, volume, etc. The listener application may perform other functions as well, such as detecting telephone caller ID pop-up requests, receiving and rendering stock market alerts, announcing arriving emails, providing billing notices to the user, alerting the user that a new movie is available for VOD viewing, or any other desired function. These alerts may be displayed by the controlled device on an associated display (e.g., a television), or on the user's remote control device 116 or 117, or both using, for example, the Basic Message routine noted above. The command application on the server 107 and listener application on the controlled device may form a control plane for controlling the operation of the controlled device, and the control plane can be implemented using any desired communication protocol, such as the EBIF example discussed above, or other protocols such as OCAP (OpenCable Applications Platform), DTA, GoogleTV, etc.

The initialization 301 may also include initializing a pairing application at the controlled device. The pairing application may include instructions that cause the controlled device to provide the application server 107 with identification information for a user's remote control device (e.g., a personal computer 114, laptop 115, mobile device 116, external mobile device 117, etc.) that will be permitted to control the operation of the controlled device. This identification information can be a unique address of the remote control device or user, or it could be a randomly-generated passphrase (discussed below). The pairing may also inform the application server 107 that the particular remote control device is to be permitted to control the controlled device, and can identify the parameters needed for the desired control plane (e.g., identifying the APIs and/or parameters in the example commands above, and any other desired communication parameters).

A pairing application may also be installed on one or more remote control devices, such as a netbook computer, personal computer, mobile phone, etc. The remote control pairing application may include, for example, an address (e.g., an IP address, URL identification, etc.) of a central office 103 (or other server on network 109) that can handle pairing for the device, and program instructions for transmitting a pairing request to the central office 103. In some embodiments, the pairing application can reside at a network server, such as an Internet or local intranet server connected to network 109, or the application server 107. The remote control device may access the pairing application using a web browser, allowing any web-enabled device to serve as a remote control device.

The remote control device may also install a remote control application. The remote control application may contain program instructions for generating a user interface that the user can use to control the remote control device, and instructions for transmitting commands to the application server 107. Similar to the pairing application discussed above, the remote control device also need not install a dedicated remote control application. Instead, the various user interfaces and functionality for a remote control application may simply reside on a networked server, such as on the application server 107, or another Internet or local intranet server accessible via the network 109. Such a user interface may simply be an HTTP (Hyper-Text Transfer Protocol) document, accessible by any compatible device, such as a web-enabled device that is configured to handle HTML documents, Java, IPHONE native applications, PSP, BLACKBERRY, etc. In such an example, the remote control device can simply use a web browser application to access a controlled device's remote control website, and perform the functions below using that web page interface.

In step 302, the controlled device may determine whether a pairing request has been received. The pairing request may be received any time a user wishes to begin using a particular remote control device to control a controlled device, such as the gateway 111 or STB/DVR 113. The request may be received, for example, when the user presses a "Pairing" button on the gateway/STB/DVR 111, choosing a "Pairing" option in an onscreen program guide, or otherwise signals to it that pairing is requested.

If pairing is requested, then in step 303, the controlled device may generate a passphrase (e.g., a randomly-generated alphanumeric value, such as "Z12SP4"), and may display this passphrase on an associated display device, such as a television. FIGS. 10a & b illustrate example screens that may be displayed by the controlled device (or generated for display on an associated display device, such as a computer monitor or television) during the pairing operation. The controlled device may then transmit, in step 304, a pairing request message to the application server 107, informing the server 107 that a pairing has been requested, and providing the controlled device's own ID (e.g., a unique media access control—MAC—address, customer identifier, or other identification) and the passphrase. In some embodiments, the controlled device or the server 107 can note the time that the passphrase was generated or delivered, and can set a time-to-live (TTL) value for the phassphrase to a limited amount of time (e.g., 30 minutes).

In step 305, the user may view the passphrase on the television, and initiate the pairing application on his/her remote control device. For example, the user may open the application on a mobile telephone (or open a web browser and go to a remote control website hosted by application server 107), and enter the passphrase. The application may then transmit a remote control pairing message containing its own identification information (e.g., an IP address of the remote control device, a MAC address of the remote control device, telephone number, user identification, etc.) and the passphrase to the central office 103, and to the application server 107. This transmission can be performed in any desired manner, depending on the data connection of the remote control device. For example, if the remote control device is a cellular telephone, such as telephone 117 in FIG. 1, then the transmission may be performed by the telephone 117 using its own radio transmitter and through a cellular telephone network 109 to arrive at the central office 103. The transmission may be an HTTP message to supply the passphrase and address information to the application server 107 (or other server hosting the remote control interface). The transmission may also include any desired parameters for the control plane, such as identification of the protocol to use (e.g., EBIF), the command APIs, etc.

In step 306, the application server 107 may receive both the pairing request from the controlled device, and the remote control device pairing message from the remote control device that the user wishes to use as a remote control. The server may receive many such messages from different devices, and may use the passphrase to uniquely identify a matched pair of a remote control device and controlled device. Having the controlled device generate the passphrase may help minimize the chance of an unauthorized pairing.

Once the application server 107 has identified the pair, it may then conduct a validity or entitlement check on the pair to verify that the requests appear genuine. A part of this check may involve comparing the current time with the time-to-live value from above, to determine if the remote control device sent its pairing request within the TTL window. If the pair is approved, then the server 107 may store a record, associating the remote control device's unique address or identifier with that of the controlled device. In some embodiments, a pairing may require authentication of the user and/or remote control device. For example, the application server 107 may require that the user also enter a password, to help assure that the user is legitimately permitted to control a given STB. If desired, any control plane parameters (e.g., EBIF command APIs, communication protocols, etc.) may also be established, and the application server 107 can configure itself to use the appropriate parameters for the command communications with the controlled device to control operation.

Figure 4:
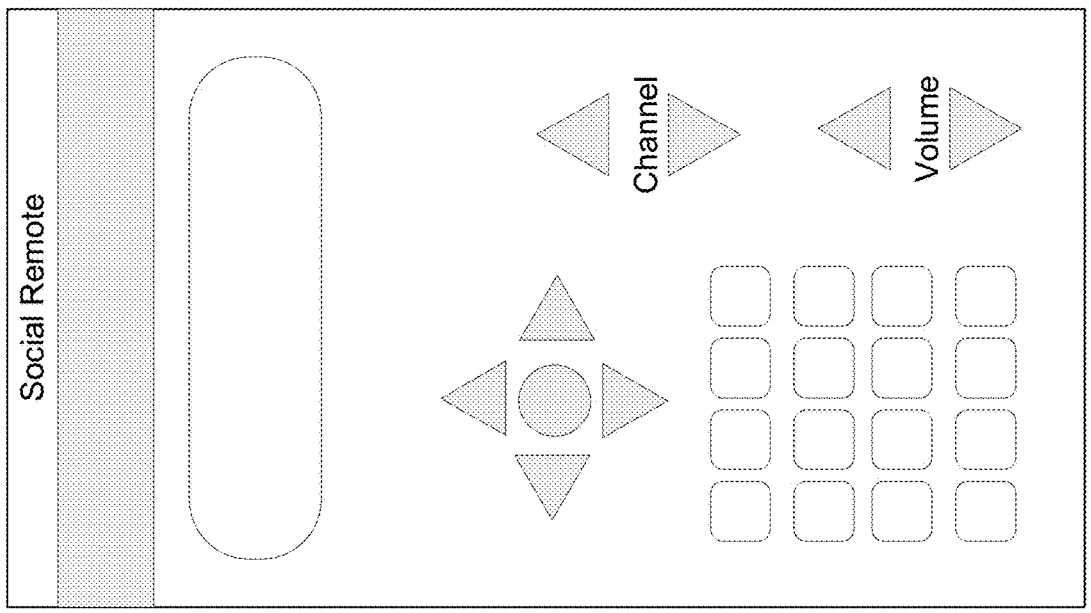

After a controlled device has been successfully paired with a remote control device, it may then be ready to be controlled by that remote control device. Example control by the remote control device begins in step 307. In step 307, the remote control device may determine whether a remote control input has been received. Such an input may be, for example, generated by the user pressing a button on the remote control device while the device is running a remote control application. The remote control application may have or generate a user interface with various buttons (graphical buttons, if the remote control device has a touch-sensitive display) for controlling the controlled device, such as numeric inputs, volume control, a program guide button, an information button, commands to control playback of content (e.g., play, fast forward, rewind, pause), a record button, etc. FIG. 4 illustrates an example of such an interface.

If an input has been received, then the application on the remote control device may formulate a remote command message to send to the application server 107. The remote command message may be formulated to contain application program interface (API) values for the various commands mentioned above. For example, if the user had entered "250" to change channels to channel 250, the application may send a message containing the following values: {Sender ID, 1, 250}, where the "Sender ID" is an identification of the remote control device, the "1" is the command code for a channel tuning function, the "250" is the source identifier for the channel to be tuned. The message may also include an identifier of the controlled device, which can be useful if the user wishes to use the same remote control device to control multiple controlled devices. The message can be sent in any desired format, and additional data values may be included in the message as well, depending on the format. For example, the message can be an Internet Protocol (IP) packet, and may have additional values, such as an IP header, frame header/footer, UDP (User Datagram Protocol) header/footer, etc.

In step 308, the remote device 117 may transmit the command message to the application server 107, and the application server may process the message in step 309. Processing the message may include identifying one or more function routines to be executed in response to the enumerated command code, and providing the parameters to those routines.

In step 310, the application server 107 may transmit a response to the remote device 117. The response may include, for example, messages and/or images to be displayed for the user, such as a message confirming that the command has been received, or containing additional information about the channel being watched. Examples of additional responses and functionality are discussed further below.

In step 311, the application server 107 may formulate a message to be delivered to the controlled device to carry out the requested command. In some embodiments, this message may be a push message (e.g., as a UDP push message). In those embodiments, the application server 107 may send an Event Execution Request message to a UDP Push server 105. The Event Execution Request message may contain commands that the controlled device will accept to carry out the requested operation. In step 312, the push server 105 may then prepare and send a push message addressed to the controlled device, and have it sent by the modem termination system 104 on a downstream data transmission over lines 101.

In step 313, the controlled device may receive the push message, and may act in response to the command contained therein. For example, if the push message included an instruction to tune to channel 250, then the controlled device may respond by doing just that. Then, in step 314, the controlled device may transmit a return message to the central office 103 (or to the application server 107) reporting the results of the command. This reporting can be a simple confirmation that the command has been carried out, or it can be an error report indicating that the command was not carried out, with additional information identifying the reason why it could not be carried out. The process may then return to step 307, and await the next command.

As noted above, the remote control device 117 may have a remote control application installed to offer user control over the controlled device. Such an application can offer a wide variety of functions, not limited to channel changing and DVR record scheduling. FIG. 4 illustrates an example user interface for the basic commands of controlling the controlled device, with buttons for entering channel numbers, opening and navigating through a program guide, recording, rewinding, pausing, fast-forwarding through a program, managing a DVR recordings list, using interactive applications, etc. The application can be written in any form, such as an HTTP script or Internet application.

Figure 5:
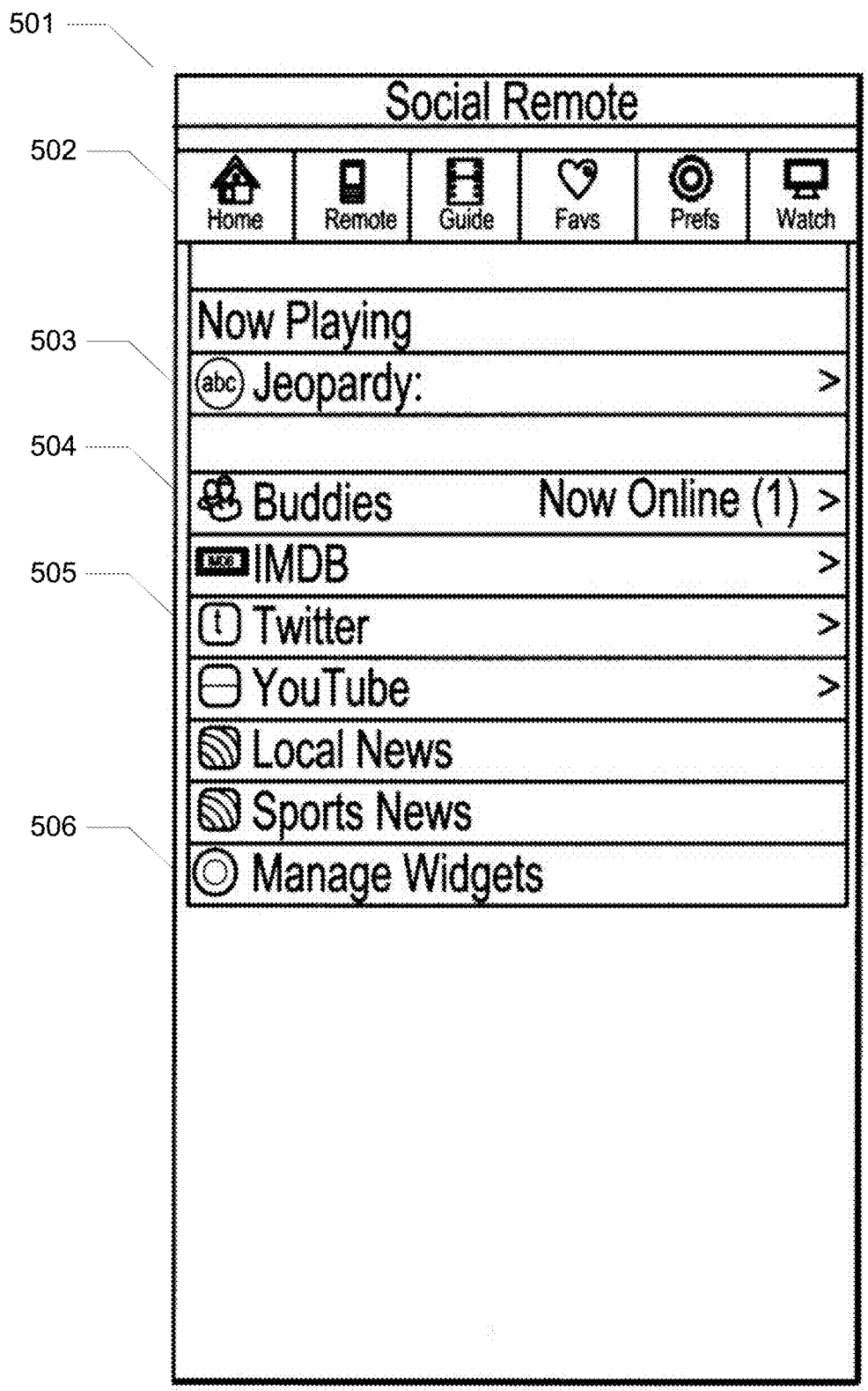

FIG. 5 illustrates an example user interface 501. The interface 501 may include various onscreen elements that can be selected using touch (if displayed on a touch-sensitive screen) or via a computer pointer or navigation highlight. The interface may include a series of selectable tabs 502 which, upon selection, may cause the display of a variety of different interfaces. Tabs can include a home tab to cause the display of the interface 501, and other tabs such as a Remote tab to cause the display of the remote control interface (e.g., FIG. 4), a Guide tab to cause the display of the program guide (e.g., FIGS. 9a & 9c, discussed below), a video on demand (VOD) tab to cause the display of a program guide for videos available on demand (FIG. 11, discussed below), a Favorites tab to cause the display of a listing of favorite channels and/or programs (e.g., FIG. 12, discussed below), a Settings tab to cause display of an interface to adjust settings (e.g., FIG. 13, discussed below), a recommendations tab to cause display of a listing of content recommendations received from others (e.g., FIG. 14, discussed below), a watch video tab to initiate a redirected stream of requested video to a different display device (e.g., to the remote control device itself, or to another location on the Internet, etc.), etc.

The interface may include a display 503 of the title for a program that is currently being viewed at the controlled device. Information identifying the currently viewed program can be sent, for example, in the response sent to the remote control device in step 310 discussed above. In the FIG. 5 example, the television show "Jeopardy!" is being viewed, and upon selection of this item, the user may see an expanded listing containing additional information about the show, and additional options for the show (e.g., options to record the show, or set a series recording, or find alternate air times for the show, etc.).

Figure 6:
Figure 15:
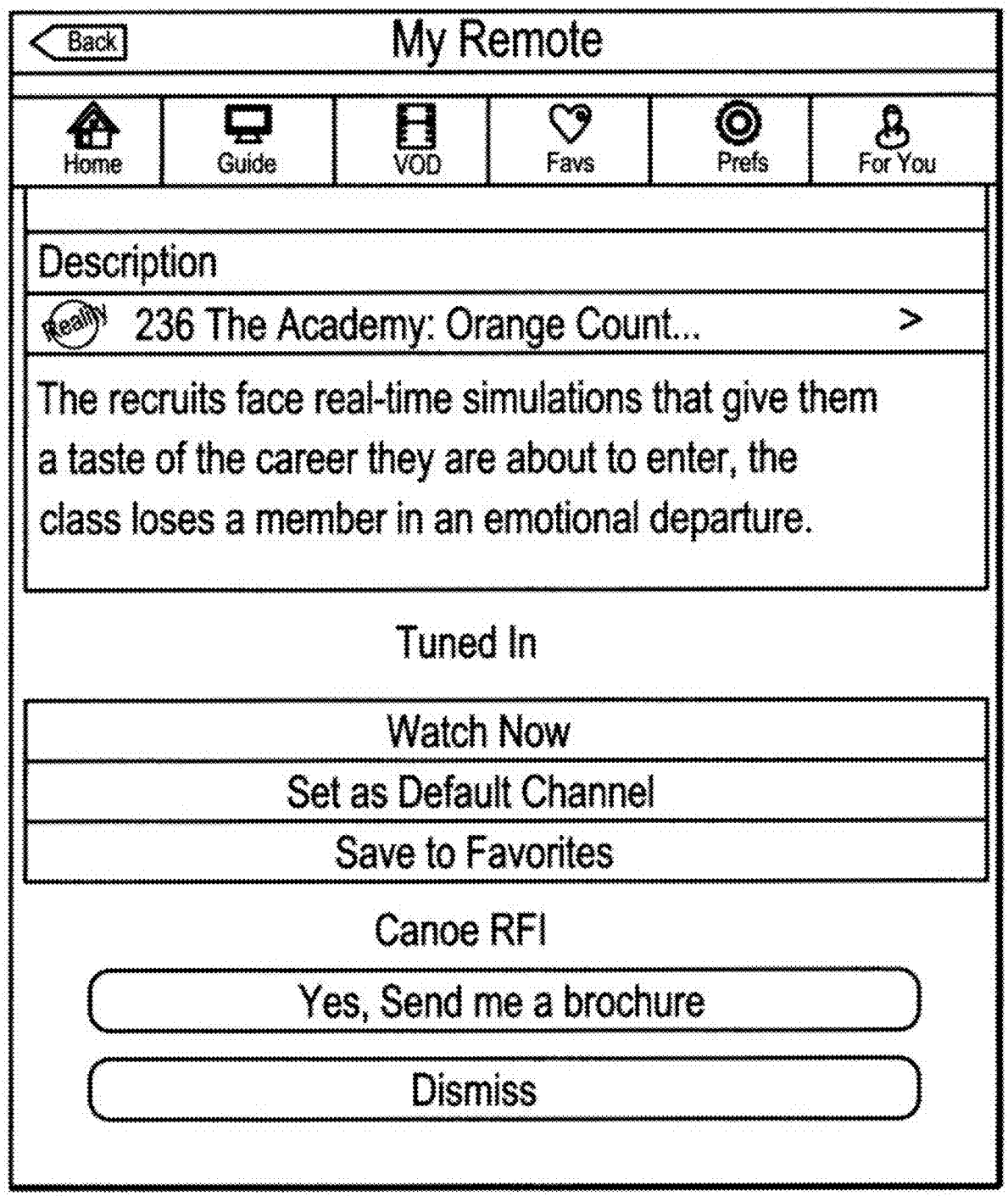

FIG. 6 illustrates an example of such an additional display. In that example, the selected program "Closing Bell" is displayed with a text description. Other options are displayed as well. Those options include an option to begin viewing the selected program. Selecting this option would send a command to the application server 107 to, in turn, send a command to the controlled device to begin tuning and/or decoding the selected program. Other options may be, for example, to set the currently selected channel (e.g., "CNBC", in this example) as a default channel to be the focus the next time the guide is opened, or to be the default channel that is tuned or decoded when the user begins to watch television, remove the channel and/or program from the favorites list, record the program, set a series recording to record each episode of the program's series, and to recommend the show to friends. Another option may allow the user to view additional available content or merchandise, relating to the selected program. FIG. 15 illustrates an example screen that can offer the user the option of requesting a mailing brochure of information about a program, or a product being discussed in the program.

A remote control command may begin with the user selection of the show from the interface 501. The remote control device's remote control application may detect this selection, and then formulate a command message (as in step 308 above) identifying the remote control device, the requested function (e.g., additional information and options for a selected program), and the selected program. The server can process and respond to the message (e.g., steps 309 and 310), replying to the remote control with additional information for the selected program (e.g., its textual description), and additional control options (e.g., the options for recording, setting a record schedule, etc.). The application server 107 can skip the creation of and sending the push message (e.g., steps 311-314), if the particular request does not require action or response from the controlled device. If the remote control application is implemented as a web page at the application server 107, then the command may simply be an HTTP command indicating user selection of a graphical interface object on the page, and the response may be another web page.

The interface 501 can also include one or more additional application options. For example, a social friends list option 504 may result in the display of a listing of a user's friends who are also online. FIG. 7a illustrates an example of such a "Buddy List" display 701. To support such functionality, the application server 107 (or another centralized server on the network 109) may monitor the users who are watching their televisions. The controlled device may be configured to transmit an upstream message to the server 107 when the user begins to view content (e.g., when the user turns on the gateway device, or enters a user identification to identify him/herself to the gateway). The application server 107 may maintain a record for each unique user, household, or consumption device, and each record may contain identifiers of other users/households/consumption devices that are designated as friends. This friend designation can occur, for example, when a user first signs up for service, or the friends list can be imported from another social network (e.g., Plaxo, Facebook, Twitter, etc.).

Figure 7B:
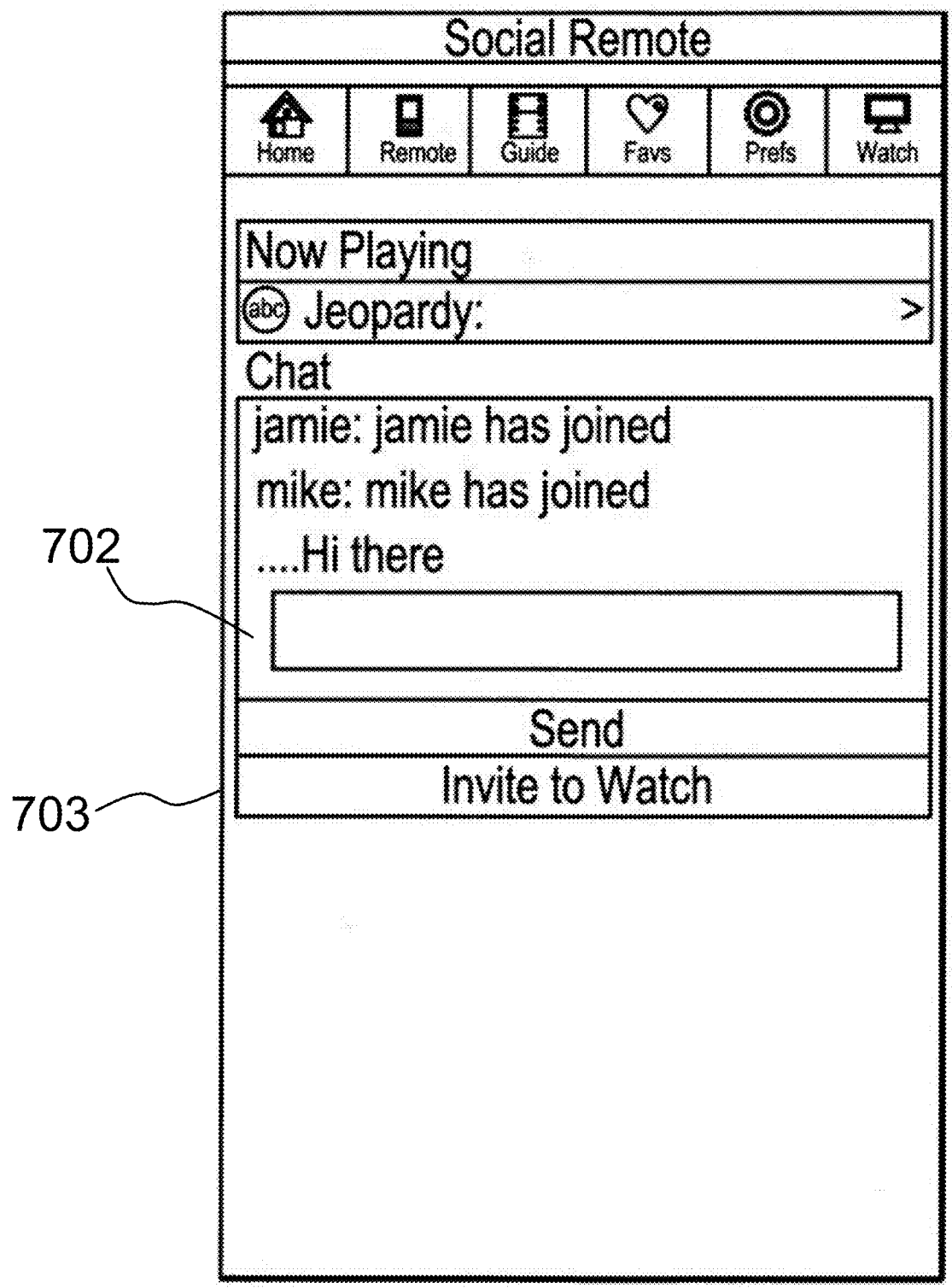

Each listed friend in the display 701 may include a name (or other identifier), and an indication of status (e.g., offline, watching "Jeopardy!", etc.). This status information, which may have been reported to the application server 107, or other servers associated with social networks and accessible by application server 107, as each friend logged on to begin watching television, may be reported back to the remote control device in step 310, and in response to a user's selection of the friends list option 504. Selecting or highlighting a listed friend may cause additional options to appear, such as options to send the friend a message, or invite the friend to join in watching the currently-viewed program. Sending this kind of request may involve, for example, delivering a pop-up message to the friend's consumption device (e.g., a gateway, STB, DVR, computer, etc.) in step 309. If the friend accepts the invitation, then the friend can be added to a chat window for the show, as illustrated in FIG. 7b. The chat window 702 may allow individuals who are participating in the chat session to type textual messages, and have those messages delivered (e.g., via Short Message Service, Multimedia Message Service, etc.) in step 309 to other users in the session. Users can also select a friend, and send an instant message directed to the selected friend.

The display may also include an option 703 to invite other members in the chat session to tune to the same program being watched by the sending user. For example, the user can select the "Invite to Watch" feature, and select some (or all) of the parties to the chat, and the inviting user's remote control device may transmit an invitation command in step 308. The invitation command may identify the content being viewed (e.g., a source identifier for "Jeopardy!"), the command requested (e.g., the invite command), and identifiers for the users to be invited (e.g., email addresses, friend codes, etc.). The application server 107 can send invitation messages to the various users (via their respective networks, central offices, application servers and/or user devices, etc.), and those users can be given the option to accept or reject the invitation. Upon accepting the invitation, the accepting user's device may automatically tune to the channel or service carrying the content, and transmit a message to the application server 107 that the user has accepted the invite.

Figure 14:
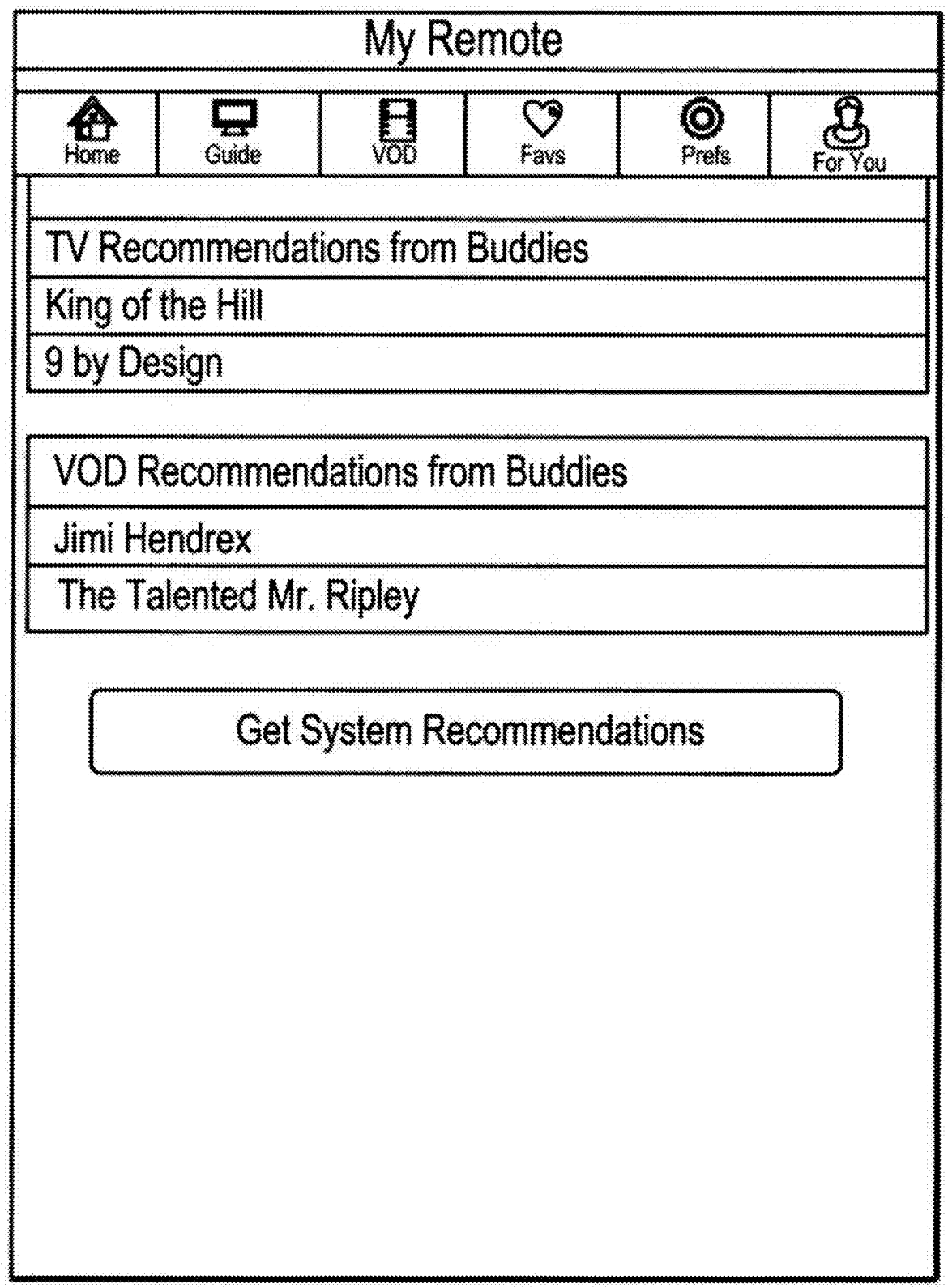

Other interactions with friends can be performed as well. For example, a user can choose to recommend a program to a friend, similar to the invitation to view. A user can also view recommendations that the friend has sent to the user, or to others. To support this latter functionality, the application server 107 may retain a listing of invites and/or recommendations that each user has sent in the past (or for a predetermined amount of time). The recommendations can also come from the system, such as from a reviewer associated with the central office 103. FIG. 14 illustrates an example display screen containing recommendations, which may be categorized (e.g., according to whether they are on-demand or linear/broadcast). In some embodiments, system recommendations and other recommendations may be optionally retrieved.

As another example, a user can choose to post a rating and/or comment for a show being watched, by choosing an option from the additional information screen in FIG. 6. The remote control application may display a text entry interface to allow the user to type a comment, and to choose a rating (e.g., numeric, number of stars, etc.), and that information can be transmitted in step 308 with a command to post the user's rating for the show. The application server 107 may, in step 309, process this message to add the user's rating to a ratings database. The user can also choose to view ratings and comments that have been supplied by other users for a particular program.

Figure 7C:
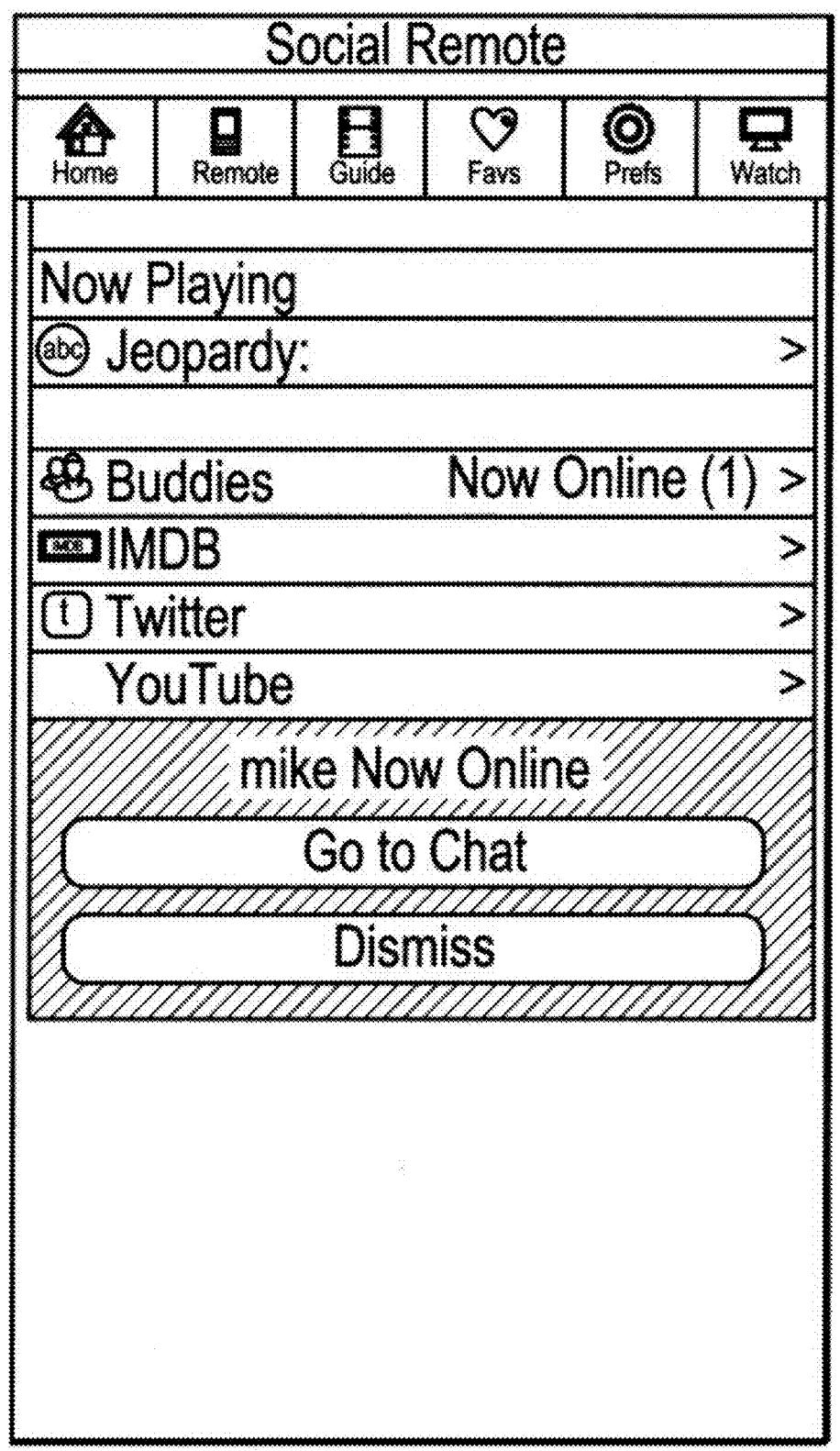

In some embodiments, when a user's friend has turned on or signed in to their respective gateway/STB/DVR to begin watching a program, the friend's gateway may transmit a sign-in message to his/her respective application server, and the application server may send a notification message to the user (e.g., by consulting the friend's own list of friends, and sending a push notification message to an address associated with each of the listed friends). The notification message may be displayed on the user's remote control device, such as that shown in FIG. 7c, and can offer the user the option of inviting the friend to join a chat or watch a show.

The user interface 501 may offer other options as well. For example, applications may be loaded to allow access to other servers on the network 109 or another network, such as servers for social networking websites (e.g., Twitter, Facebook), databases (e.g., Wikipedia, Internet Movie Data-Base—IMDB), and other information resources (e.g., You- Tube, local news station, sports news website). Selecting any one of these options 505 may result in sending a command message in step 308 identifying the selected option, and a corresponding processing 309 and response 310, examples of which are described below. Since the application server 107 may be connected to these resources through the network 109 (e.g., the Internet or another public or local network), a wide variety of functionality can be supported.

Figure 8:
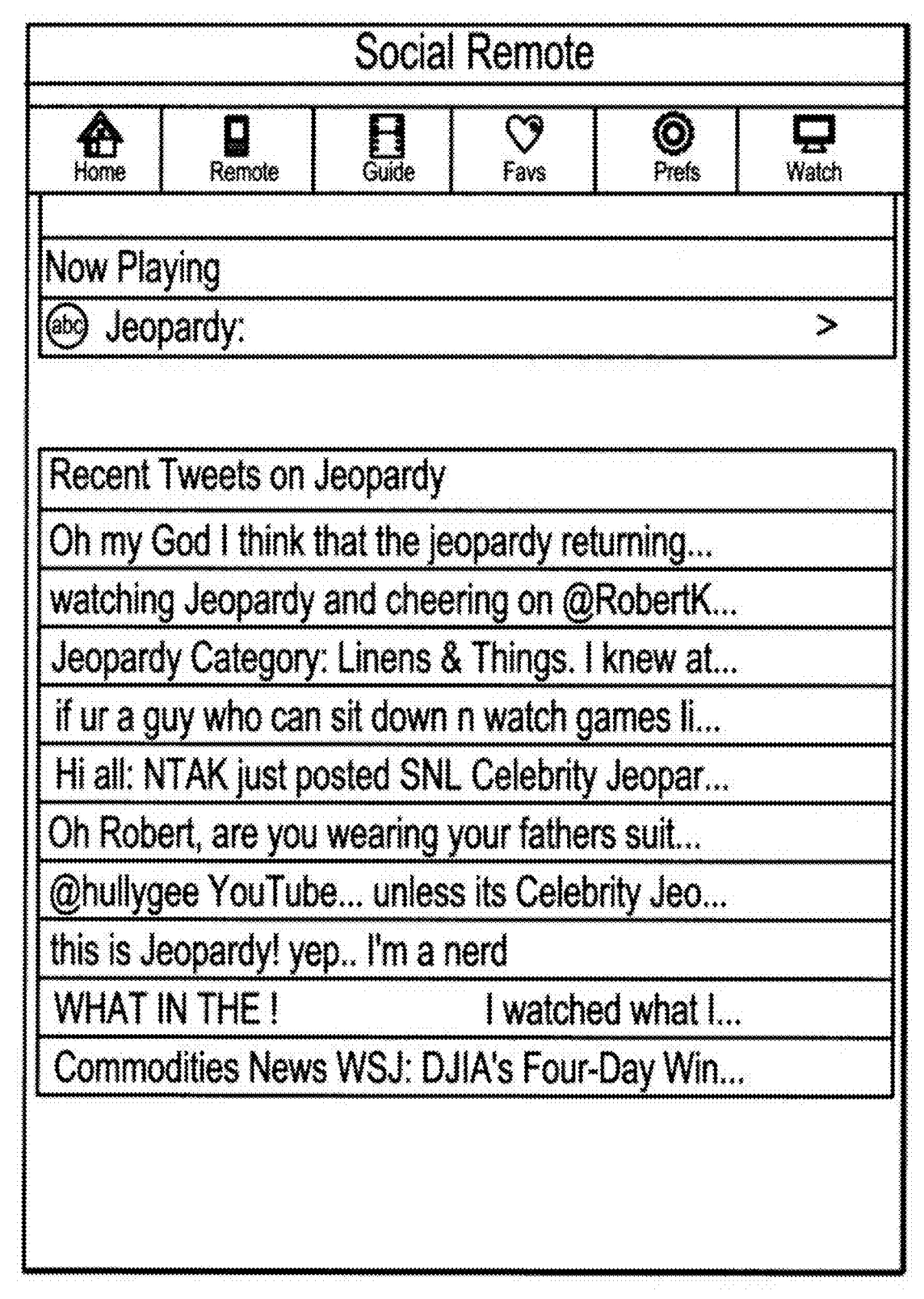

One example may be to allow a user to access a website. For example, selecting an option 505 for the Twitter application may result in transmitting an HTTP request for the Twitter Internet server (e.g., "www.twitter.com"). The request may be accompanied by additional contextual information, such as the name of a television program being watched at the time (e.g., "Jeopardy!"). The server for that application may use the contextual information to conduct a contextual query, and provide information based on the supplied contextual information. So, for example, for a social RSS (Really Simple Syndication) or ATOM Syndication news feed site like Twitter, the resulting information supplied back to the server 107 and to the device 117 may be a listing of RSS feeds relating to the topic of "Jeopardy!", as illustrated in FIG. 8. Requests to other sites may result in a search for other information about the particular program, its stars/actors, related programs, etc.

Other contextual information may be supplied as well. For example, if the remote control device is equipped with location determining capabilities (e.g., via a global positioning system, or with address information keyed to the user), then the location can be included as contextual information. The location information can be used to generate a location-specific query through an Internet database, for example, to limit RSS feeds to those originating from within a predetermined distance (e.g., 5 miles) of the user. In this way, the user can see RSS feeds that are relevant to the show being watched, and posted by neighbors.

Other websites and applications may be accessed as well. One example application may be an Internet browser, which may allow the user to browse the Internet using the remote control device. In some embodiments, the device may display the remote control interfaces (e.g., FIG. 5) in a window on a part of a display screen, and the browser (or other application interface) can be displayed on other parts of the screen.

Another option in the screen 501 may be an option 506 to manage applications appearing in the remote control application. For example, the user could turn on or off individual applications, adjust display settings and viewing preferences, etc.

Figure 9A:
Figure 9B:
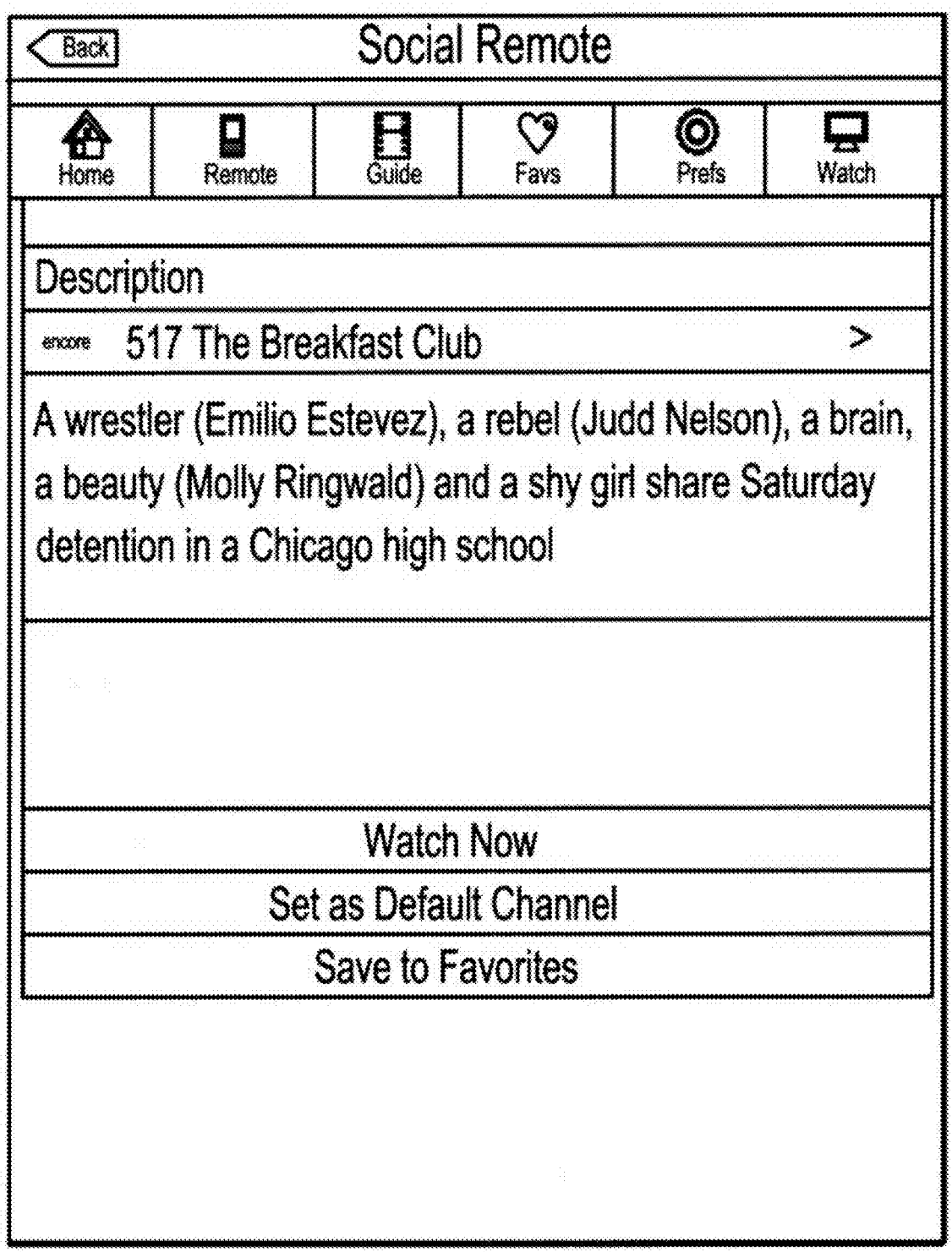

Another option in the screen 501 may be an option to view a program guide, listing available content and their air times, titles, service provider, price, etc. (the guide may itself be the same as, or an extension of, a guide provided by the gateway or STB/DVR 111). FIG. 9a illustrates an example program guide listing, showing a listing of content. The listing may be scrolled, and by selecting one, the user may be presented with additional information and options for the selected listing, as illustrated in FIG. 9b. The additional information may include a detailed textual description, and the additional options may include the option to change channels to begin viewing the program ("Watch Now"), set this channel as a default channel for future guide displays (e.g., the default channel may be the channel that is initially displayed in the guide, or initially tuned when the gateway/STB/DVR is first turned on), save the current program to a list of favorite programs (e.g., recording the program and saving it in a favorites list), or others. To support such a feature, the application server may process, e.t., at step 309, a message from the remote control device requesting a guide listing, and may consult a network database to retrieve listings for the requesting user. The retrieved listings can be supplied as part of the response 310.

Figure 9C:
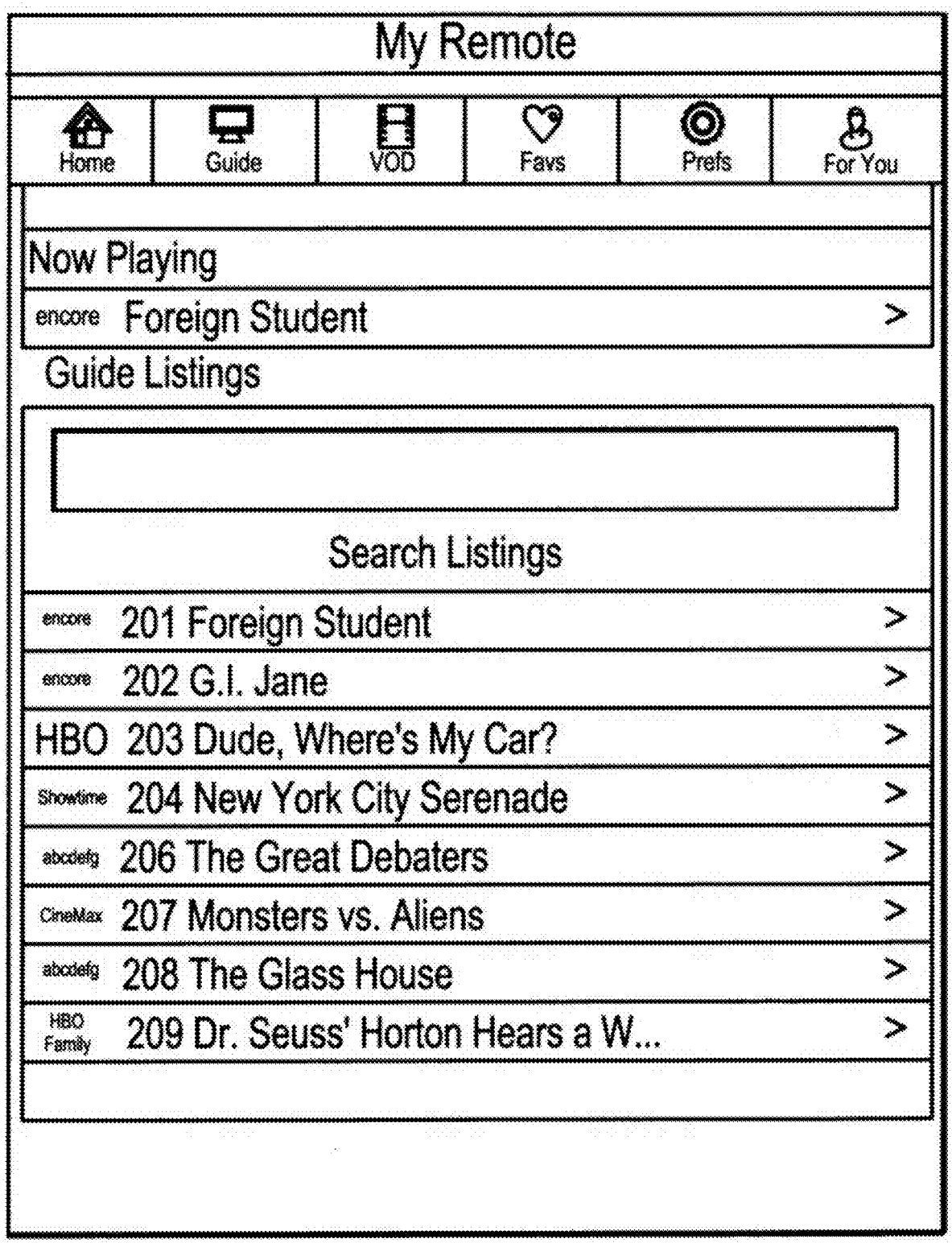

The content listings may be manipulated and searched in other ways as well. For example, the user can choose to view the listings sorted by title, genre, sub-genre, combination of genres, description text keywords, etc. Users can enter text to conduct text searches for programs by title, actor, description, etc. Services may be added to a favorites list, and the user can view a listing containing just entries for services on that favorites list. FIG. 9c illustrates an example guide display that includes a search option that, if selected, can direct the user to a text input interface to allow entry of keywords for searching, or to a category selection menu to allow selection of other search criteria.

Figure 11:
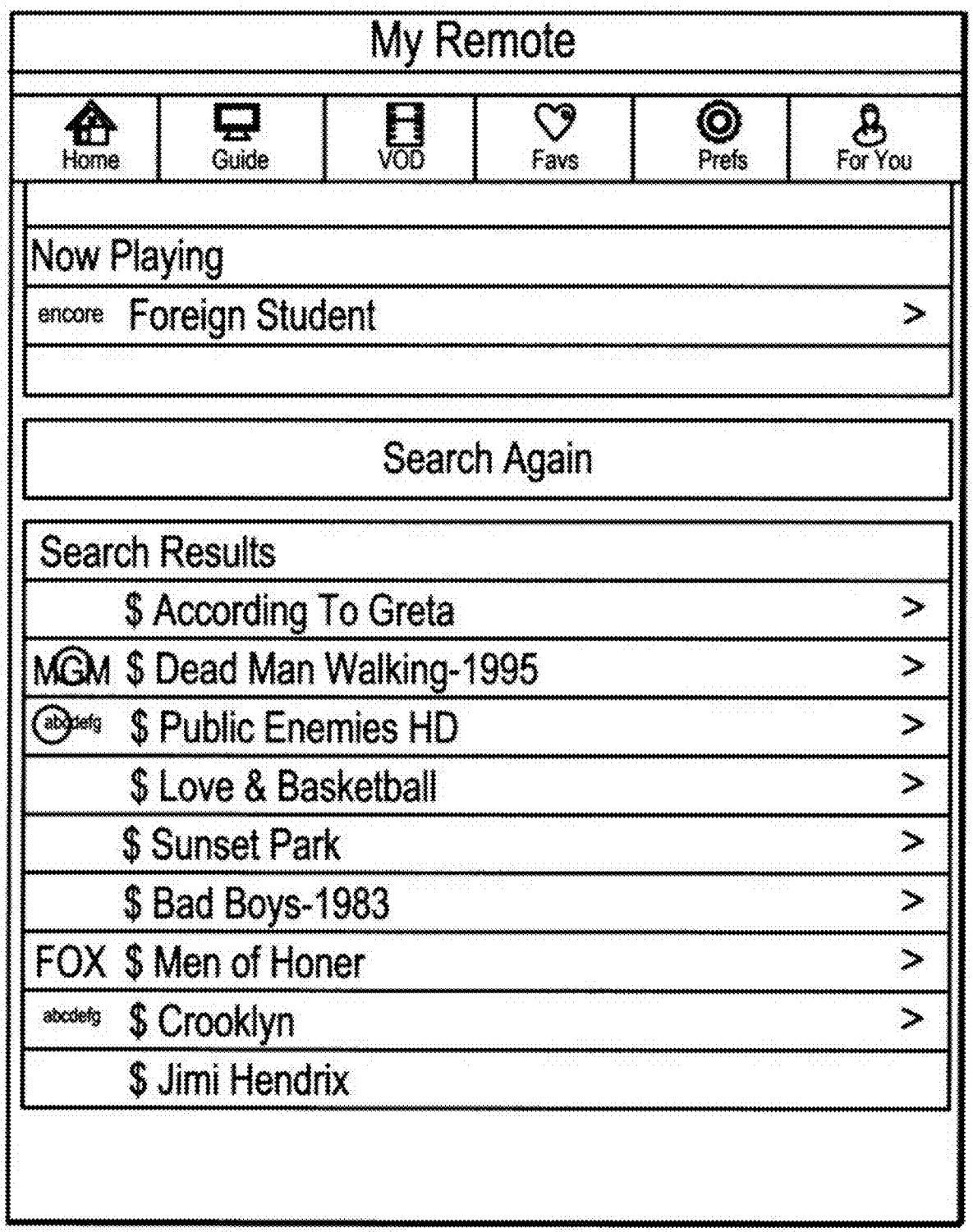
Figure 12:
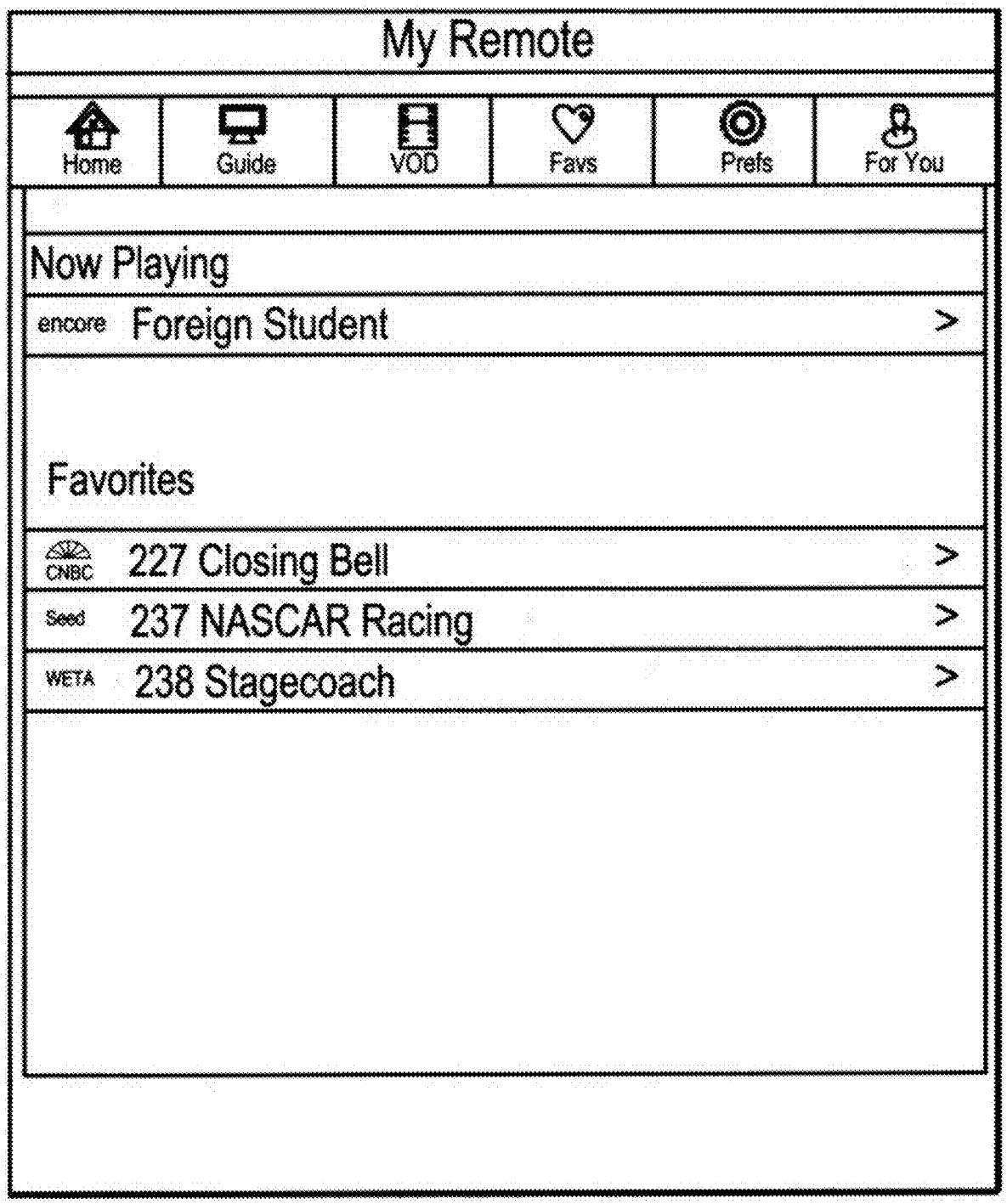

In some embodiments, content that is aired as part of multicast or broadcast transmissions can be separated from content that is available for immediate access (e.g., video on demand), or they may be displayed together in a combined listing. FIG. 11 illustrates an example listing that focuses on programs that are available as video on demand programs. In some embodiments, the listings may be personalized for the user and/or device 117. The personalization may be based on a user's stored favorites list on the application server 107, or on location-based information (e.g., if the device 117 has global positioning capabilities, the location can be delivered with the command to view the guide listings, and the server 107 may respond by filtering the listings to only show services that are locally available in the user or device's vicinity). FIG. 12 illustrates an example display containing a listing of the user's favorite programs.

As noted above, the application server 107 may be made aware of tuning commands entered by a user. This can inform the server 107 of the program being viewed, and can be used by the server 107 to select advertising information to be supplied to the user. For example, the tuning command may be accompanied by user identification information (e.g., a user name or tag), and the server 107 may store a profile database identifying demographic information for various users of the system. Based on the demographic information, and knowledge of the particular program being watched, the server 107 can choose to insert certain advertising information into the content (e.g., video insertion into a television show), or into the user interface (e.g., the display appearing on the remote device 117). The server 107 can also store information tracking a user's interactive usage, monitoring the types of applications he/she runs, how frequently they are run, what uses they experience, etc. All activity can be logged, and this information can be reported to external servers, and can also be used to identify and recommend additional interactive applications that become available, send users alerts to offer additional products and services, etc. In some embodiments, the user's remote device 117 may receive a pop-up display, asking if the user would like to receive additional products, services or information relating to a program being viewed or selected in the guide, based on the logged information.

In some embodiments, the usage and/or viewing history information may be processed to remove unreliable entries. For example, if the gateway/STB/DVR reports that the user was viewing a particular channel for longer than a predetermined amount of time (e.g., a full day, 2 days, etc.), then it is likely that the user simply left the device on, and was not truly watching the entire time. Such unreliable data can be removed before being included in a report or used.

In some embodiments, the collected usage information can be queried to identify viewing patterns for multiple users, and/or for a single user over time. These queries can allow even greater levels of customization and personalization for future delivery of content. The application server 107 (or a more centralized server on the network 109) can expose additional APIs to allow third parties to view some or all of the logged data. For example, a central office 103 may expose an enumerated command API (or web page) to allow an advertiser to run queries on viewing data for a given time period, or among a given age/geographic demographic.

In some embodiments, in which multiple central offices may serve different groups of users, a centralized pairing server (not shown) may be connected to a network, and pairing requests from controlled devices and remote control devices may be automatically directed to the centralized pairing server. The centralized pairing server may then handle the pairing. Indeed, in the example of FIG. 1, the server 107 may be centrally located, or it may be distributed across the various homes, such as in the gateway/STB/DVR 111.

In some embodiments, the functionality of the gateway/STB/DVR 111 may be programmed into the gateway/STB/DVR 111 via download during manufacture and/or bootup at the user's premises (e.g., the listener application may be a part of the device's own default operating system, and may even be proprietary to the manufacturer of the device, with only the necessary APIs being exposed). In some embodiments, a legacy device (e.g., a legacy STB) may be augmented with the remote control application software via an external memory device and control circuit, such as a Universal Serial Bus dongle. The choice of including the listener application as a default or an upgrade may be based, for example, on the initial complexity of the device being controlled. A simpler device, such as a home appliance (e.g., air conditioner) might omit such functionality in its default programming, while a more sophisticated device (e.g., home security system, gateway, etc.) may include it as a default.

As noted above, the remote control application interface may allow the user to set parameters for operation. FIG. 13 illustrates an example display for this purpose. In the display, the user may have an option 1301 to choose which device to control. The interface can list one or more devices (e.g., gateways, STBs, DVRs, display devices, etc.) that have undergone the pairing process with the current remote device, and are available for control. For example, the user can initiate the FIG. 3 pairing process with a first STB, and then do so again with a DVR in the same (or different) house. Each pairing may be recorded by the application server 107, and the server 107 may allow the user to select which one to control. The second (or subsequent) pairing request can repeat steps 302-306, with new passphrases generated by the additional device (or devices) that are to be controlled, allowing the user's remote control device to be paired with multiple content access devices.

Selection of different devices may result in display of different command options, as some options might not be available on other devices. For example, trickplay commands (e.g., fast forward, rewind, etc.) might be of no use if the user is controlling a simple set-top box that lacks that functionality, so those commands need not appear in the remote control interface if such a simple device is controlled. In some embodiments, such as the program guide example discussed above, the remote device may display user interface elements that are normally generated by the gateway or STB/DVR 111 for local display on a connected display device (e.g., a television, video monitor, etc.). The gateway or STB/DVR 111 may transmit messages to the server 107 to cause the remote device to display suitable displays with which the user can interact, and the remote device can transmit commands (e.g., the example commands discussed above, or others) to the gateway or STB/DVR 111 (e.g., via the server 107) to report back results of user interaction (e.g., a tuning command to tune to the program the user chose from the program guide). In this manner, and if desired, the remote device 117 may be used as a shortcut to bypass some of the interaction with the gateway or STB/DVR 111 (e.g., if, for example, finding and choosing a program is easier using the device 117 than the STB's onscreen program guide). In such an embodiment, the various commands being sent from the remote control device may further include information identifying the controlled device for which the command was intended.

Other settings options may include a text box 1302 to use when entering a passphrase in step 305. A "nickname" option may allow the user to enter a custom name for the device, for ease of reference and display in the device selection option 1301. The settings options may also allow entry 1303 of other parameters, such as IP address locations for configuration files (e.g., schema locations), or parameters used for other websites or networks (e.g., usernames for social websites, cell phone number, etc.). For example, FIG. 13 illustrates a nickname of "Dev STB" for one device. If the user had previously paired the remote device with other devices, the user can have provided nicknames for each of those other devices as well, such that the list could include other devices, such as "Bedroom DVR" and "Kitchen TV", etc.

The information and options that are made available to the user on the remote application interface may be customized, as discussed above. This customization can also be performed automatically, such as during the pairing process. For example, once a remote control device is paired, the application server 107 may access account information associate with the paired controlled device (or user), and can use that information to pull guide information, channel lineups, service entitlements, parental controls, personal preferences, etc. from one or more databases based on the identity of the paired controlled device or user. So, for example, if the application server 107 knows that a given user's DVR is a digital DVR with HD (high definition) capability, the application server 107 can provide guide information that includes HD listings.

In some embodiments, the application server 107 and/or remote control application may allow a user to upload applications that the user has written, to add the application functionality to the remote control interface. This addition may be the introduction of a simple RSS feed created by the user, or it can be more complex.

In some embodiments, third parties may use the enumerated command API to send messages to their own customers, without requiring their own EBIF application on each controlled device. For example, a third party's server (not shown) may connect to the Internet (e.g., network 109 or other network), and transmit a request to application server 107 to have messages displayed on users' STBs. The message can be a simple HTTP packet containing the enumerated command parameters discussed above. It can also be a simple selection from a web page offered by the application server 107.

The pairing request in step 302 may be originated by the controlled device, for example, upon initialization. Similarly, the pairing request can also be originated by the remote control device 117. FIG. 16 illustrates an example of this remote-initiated pairing. In step 1601, the user may use the remote control device and log in to the application server 107 by providing, for example, a user identification, password, and remote control device identification, and request to initialize pairing. The request, as with the step 302 example, can be automatically performed upon the user's initial log in to the system, or it can be performed upon the user's request.

In step 1602, the application server 107 may retrieve a previously-stored listing of devices that are associated with the user's account. For example, the user may have previously created an account to supply one or more gateway/STB/DVRs 111 with access to content, and in doing so the application server 107 may have stored a listing of these devices for the particular user. The listing may identify the devices, for example, by a unique device address (e.g., a MAC address) and/or logical address (e.g., an IP address assigned to the device). Those devices may already have been authorized for access to content provided by the application server 107, and the server 107 may already have identification information from the remote control device through the log-in process, so the pairing of remote control device to the various approved devices may automatically be performed upon the user's log in with the device. For example, the simple act of logging in may result in the application server 107 storing an authorized pairing of the remote control device to each of the registered devices of the user.

The pairing process may include a nicknaming process such as that described above in FIG. 13. To help the user and application server 107 coordinate the nicknaming, in step 1603, the application server 107 may transmit messages to each of the user's controlled devices, and can transmit a message to the remote control device, listing the known/registered devices by their default/current name (the default or current names may be any desired label or handle used to identify the devices), along with the messages being sent to each. The messages may be unique to each device, and may be any desired phrase, such as the Pass Phrase shown in FIG. 10b. By viewing the messages displayed on or by the gateway/STB/DVR 111, the user can then identify the devices and rename them to a more suitable name.

Figure 17:
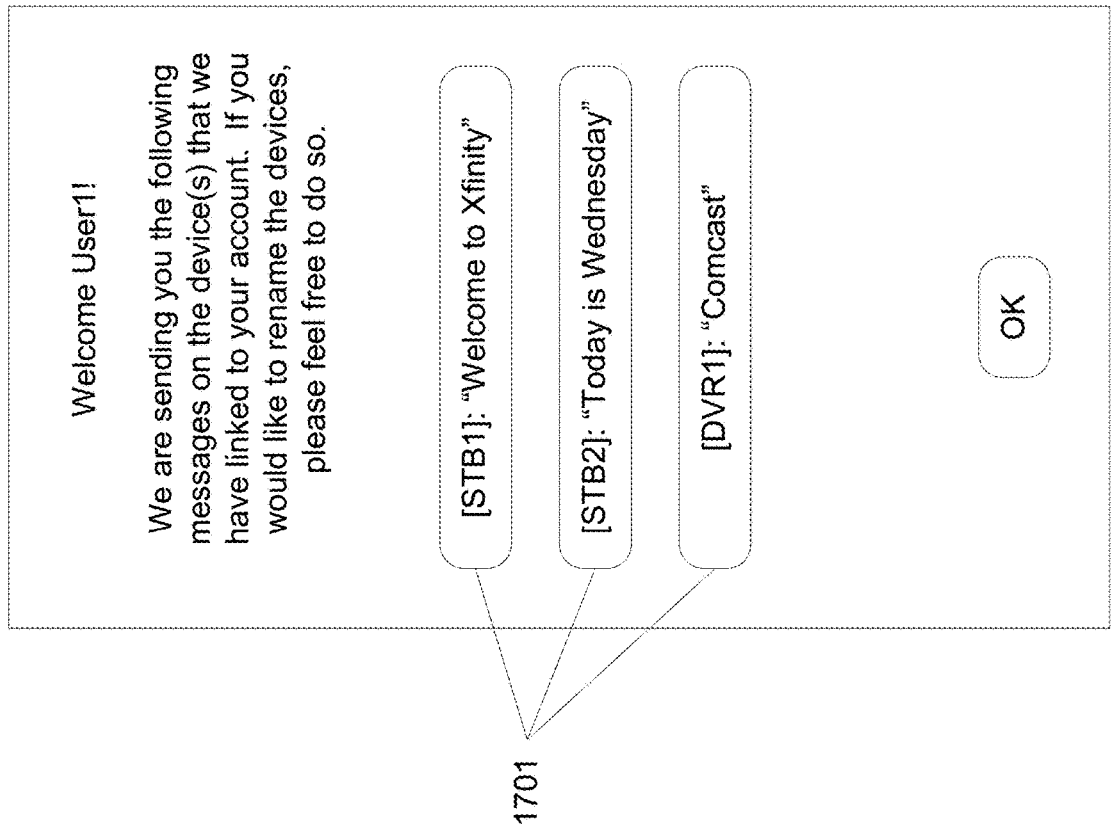
FIG. 17 illustrates an example remote control application display.

FIG. 17 illustrates an example screen that may be displayed on remote control device for this purpose. The screen may include listings 1701, with the default names (e.g., "STB1", "STB2" and "DVR1") and the messages being sent to each (e.g., "Welcome to Xfinity", "Today is Wednesday" and "Comcast"). Seeing these messages displayed on the corresponding devices (gateway/STB/DVR 111), the user can then associate the default names with the actual devices, and can rename them as desired. So, for example, the user could tap on one of the listed devices in FIG. 17, and enter a new name (e.g., "STB1" can be renamed to "Living Room TV").

The above discussed embodiments are simply examples, and modifications may be made as desired for different implementations. For example, steps and/or components may be subdivided, combined, rearranged, removed and/or augmented as desired. Also, although an EBIF example is discussed, the control plane protocol can be in any desired protocol, such as OCAP (OpenCable Application Platform), DTA, GoogleTV, etc. Additional features may be added.

The attached Appendix A contains example source code listings for various features described herein.

APPENDIX A

The following listing is an example XML schema listing for the listener application, which can be executed on the gateway/STB/DVR 111:

```
<xs:schema xmlns:xsi="http://www.w3.org/2001/XMLSchema-instance"
    xmlns:mac="http://location/data-types"
xmlns:xs="http://www.w3.org/2001/XMLSchema"
    elementFormDefault="qualified" attributeFormDefault="unqualified">
    <xs:import namespace="http://location/data-types" schemaLocation="data-types-3.2.xsd"/>
<!--
    Code Values are:
        Display Alert = 0
            param 1 = headline
            param 2 = story
        Tune to Source ID = 1
            param 1 = source id
        Load VOD = 2
            param 1 = provider id
            param 2 = asset id
        Set DVR Recording = 3
            param 1 = source id
            param 2 = start time (GMT)
        Set DVR Series Recording = 4
            param 1 = source id
            param 2 = start time (GMT)
            param 3 = series id
-->
    <xs:element name="data">
        <xs:complexType>
            <xs:sequence>
                <xs:element name="alert-trig" type="alert-trig-format"/>
            </xs:sequence>
        </xs:complexType>
    </xs:element>
    <xs:complexType name="alert-trig-format">
        <xs:sequence>
            <xs:element name="row">
```

```
                <xs:complexType>
                    <xs:sequence>
                        <xs:element name="code" type="mac:int16"/>
                        <xs:element name="param1" type="mac:mixed-string"/>
                        <xs:element name="param2" type="mac:mixed-string"/>
                        <xs:element name="param3" type="mac:mixed-string"/>
                    </xs:sequence>
                </xs:complexType>
            </xs:element>
        </xs:sequence>
    </xs:complexType>
</xs:schema>
```

The following listing is an example XML file to support the listener application:

```
            <?xml version="1.0" encoding="UTF-8" ?>
- <mac xmlns:xsi="http://www.w3.org/2001/XMLSchema-instance">
    <var name="trig-index" type="int">-1</var>
    <var name="alert-display-level" type="int">0</var>
    <var name="CODE_DISPLAY_ALERT" type="int">0</var>
    <var name="CODE_TUNE_TO_SOURCE_ID" type="int">1</var>
    <var name="CODE_LOAD_VOD" type="int">2</var>
    <var name="CODE_SET_DVR_RECORDING" type="int">3</var>
    <var name="CODE_SET_DVR_SERIES_RECORDING" type="int">4</var>
    <var name="intVar1" type="int">0</var>
    <var name="intVar2" type="int">0</var>
    <var name="channelLocator" type="locator" />
- 
        - <!--
            FIRES WHEN UDP TRIGGER IS SENT TO APP
            -->
    <triggerevent format="alert-trig" action="call(ConsumeTrigger)" />
    <timer name="hide-alert-timer" period="20000" loop="1"
            ontimer="call(HandleHideAlertTimer)" />
- <keymap>
    <keypress keycode="KEY_YELLOW" action="call(DisplayHeadline)" />
    <keypress keycode="KEY_RED" action="call(DisplayInfo)" />
        </keymap>
    <text name="alert_headline" x="110" y="400" width="500" height="26" style="style-alert"
            hidden="true" />
    <text name="alert_story" x="110" y="348" width="500" height="78" multiline="true"
            style="style-alert2" hidden="true" />
    <image name="alert_img" x="70" y="394" width="32" height="32" src="alert_png"
            hidden="true" />
- <sub name="ConsumeTrigger">
    <action value="debug(in ConsumeTrigger); resume( )" />
- <if>
    <test lhs="$trig-index" expr="gt" rhs="-1" />
        - <!--
            CLEAR OUT THE TRIGGER TABLE
            -->
    <action value="deletetriggerrow($$alert-trig, 0); sub($trig-index, 1)" />
            </if>
        - <!--
            ASSIGN PASSED TRIG VALUES TO LOCAL VARS
            -->
    <action value="add($trig-index,1); debug(Alert code is $$alert-trig[$trig-index].code)" />
- <if>
    <test lhs="$$alert-trig[$trig-index].code" rhs="$CODE_DISPLAY_ALERT" expr="eq" />
    <action value="call(HandleDisplayAlert)" />
            </if>
- <elseif>
    <test lhs="$$alert-trig[$trig-index].code" rhs="$CODE_TUNE_TO_SOURCE_ID" expr="eq" />
    <action value="call(HandleTuneToSourceID)" />
            </elseif>
- <elseif>
    <test lhs="$$alert-trig[$trig-index].code" rhs="$CODE_LOAD_VOD" expr="eq" />
    <action value="call(HandleLoadVOD)" />
            </elseif>
- <elseif>
    <test lhs="$$alert-trig[$trig-index].code" rhs="$CODE_SET_DVR_RECORDING" expr="eq"
            />
```

```xml
            <action value="call(HandleSetDVRRecording)" />
        </elseif>
    <elseif>
        <test lhs="$$alert-trig[$trig-index].code" rhs="$CODE_SET_DVR_SERIES_RECORDING"
            expr="eq" />
        <action value="call(HandleSetDVRSeriesRecording)" />
        </elseif>
    </sub>
<sub name="HandleDisplayAlert">
    <action value="debug(inHandleDisplayAlert); set(@alert_headline.text, $$alert-trig[$trig-
        index].param1); set(@alert_story.text, $$alert-trig[$trig-index].param2);
        set(@alert_img.hidden, false); redraw(@alert_img); start(@hide-alert-timer)" />
    </sub>
<sub name="HandleTuneToSourceID">
    <action value="debug('inHandleTuneToSourceID, source id = $$alert-trig[$trig-index].param1');
        stringconvert($intVar1, $$alert-trig[$trig-index].param1); set($channelLocator,'tv-source-
        id://$intVar1'); selectservice($channelLocator); call(CheckSelectServiceError)" />
    </sub>
<sub name="HandleLoadVOD">
    <action value="debug('in HandleLoadVOD, provider = $$alert-trig[$trig-index].param1, asset =
        $$alert-trig[$trig-index].param2'); set($vodTarget, vod://$$alert-trig[$trig-
        index].param1/$$alert-trig[$trig-index].param2?i=1); load(vod-vwr)" />
    </sub>
<sub name="HandleSetDVRRecording">
    <action value="debug('in HandleSetDVRRecording, source = $$alert-trig[$trig-index].param1,
        start time = $$alert-trig[$trig-index].param2'); set($channelLocator,tv-source-id://$$alert-
        trig[$trig-index].param1); stringconvert($intVar1, $$alert-trig[$trig-index].param2);
        setrecord($channelLocator, $intVar1)" />
    </sub>
<sub name="HandleSetDVRSeriesRecording">
    <action value="debug('in HandleSetDVRSeriesRecording, source = $$alert-trig[$trig-
        index].param1, start time = $$alert-trig[$trig-index].param2, series = $$alert-trig[$trig-
        index].param3'); set($channelLocator,tv-source-id://$$alert-trig[$trig-index].param1);
        stringconvert($intVar1, $$alert-trig[$trig-index].param2); stringconvert($intVar2, $$alert-
        trig[$trig-index].param3); setrecord($channelLocator, $intVar1, $intVar2)" />
    </sub>
<sub name="Init">
    <action value="debug(in MyAlerts Init)" />
    <action value="call(DisplayInfo)" />
    </sub>
<sub name="DisplayInfo">
    <action value="debug(in DisplayInfo)" />
    <action value="stop(@hide-alert-timer)" />
        <!--
        restart timer to delay hiding of widget
        -->
    <action value="set(@alert_headline.text, MyAlerts 1.0); set(@alert_headline.hidden,
        false);redraw(@main)" />
    <action value="start(@hide-alert-timer)" />
    </sub>
<sub name="DisplayHeadline">
    <action value="debug('in DisplayHeadline, level = $alert-display-level')" />
    <action value="stop(@hide-alert-timer)" />
        <!--
        restart timer to delay hiding of widget
        -->
    <if>
        <test lhs="$alert-display-level" expr="lt" rhs="1" />
            <!--
            Display Headline
            -->
        <action value="set(@alert_img.hidden, false);set(@alert_headline.hidden,
            false);redraw(@main); set($alert-display-level, 1)" />
        </if>
    <elseif>
        <test lhs="$alert-display-level" expr="lt" rhs="2" />
            <!--
            Display Headline
            -->
        <action value="set(@alert_img.hidden, false);set(@alert_story.hidden, false);redraw(@main);
            set($alert-display-level, 2)" />
        </elseif>
    <elseif>
        <test lhs="$alert-display-level" expr="lt" rhs="3" />
            <!--
            Hide
            -->
        <action value="call(HandleHideAlertTimer)" />
        </elseif>
```

```
            <action value="start(@hide-alert-timer)" />
                </sub>
- <sub name="HandleHideAlertTimer">
    <action value="debug(in HandleHideAlertTimer)" />
    <action value="set(@alert_img.hidden, true); set(@alert_headline.hidden, true);
                set(@alert_story.hidden, true); set($alert-display-level, 0); stop(@hide-alert-timer);
                redraw(@main)" />
        </sub>
- <sub name="CheckSelectServiceError">
    <action value="debug(checkSelectServiceError: Error = #client.rv);" />
- <if>
    <test lhs="#client.rv" expr="eq" rhs="0" />
    <action value="debug(checkSelectServiceError: error occurred while selecting service);
                set(@alert_headline.text, Error tuning to source $$alert-trig[$trig-index].param1);
                set(@alert_headline.hidden, false); redraw(@main); start(@hide-alert-timer)" />
        </if>
- <else>
    <action value="debug(checkSelectServiceError: request successful);" />
            </else>
            </sub>

</mac>
```

The following is an example XML listing for a remote control application:

```
        <?xml version="1.0" encoding="UTF-8" ?>
- <mac xmlns:xsi="http://www.w3.org/2001/XMLSchema-instance">
    <twowaytable name="registerSettopData" format="registerSettopData" />
        - <!--
            DEFINES
            -->
    <var name="PASS_PHRASE_GENERATED" type="int">0</var>
    <var name="SETTOP_REGISTERED" type="int">0</var>
    <var name="intVar1" type="int">0</var>
    <var name="intVar2" type="int">0</var>
    <var name="counter" type="int">0</var>
    <var name="alphaChar" type="stringcopy" length="2" />
    <var name="passPhrase" type="stringcopy" length="6" />
    <var name="step1Instructions" type="string">Enabling your My Remote application is easy.
                Step 1 is to generate a unique Pass Phrase. This phrase is used to pair your remote with your
                settop and is valid for 30 minutes.</var>
    <var name="step2Instructions" type="string">Step 2 is to register your settop. This will pair your
                settop with the unique Pass Phrase generated in Step 1.</var>
    <var name="step3Instructions" type="string">Congratulations! Your settop is now registered.
                Step 3 is to enter your unique Pass Phrase generated in Step 1 into the pairing screen of the
                My Remote application.</var>
    <var name="failedPostMessage" type="string">We are unable to register your settop at this time.
                Please try again later.</var>
    <array name="alphaArray" type="string" length="26" />
- <page style="style-black-bkg" onappstatechange="call(AppStateChangeHandler)"
                onchannelchange="terminate( )">
    <text name="sr_title" x="140" y="50" height="40" width="568" style="style-title-text">My
                Remote - Register Settop</text>
- <container name="menu_buttons_container" x="0" y="92" height="172" width="270"
                style="style-black-bkg">
    <rect name="menuTopCinemaBar" x="0" y="0" height="20" width="270" style="style-
                unfocused-cinema-bar" />
    <image name="sr_img" x="0" y="20" width="270" height="146" src="social_remote_img" />
    <rect name="menuBottomCinemaBar" x="0" y="166" height="6" width="270" style="style-
                unfocused-cinema-bar" />
        </container>
- <container name="main_window_container" x="270" y="92" height="172" width="434"
                style="style-black-bkg">
    <navmap focus="@btnGeneratePassPhrase" />
    <rect name="mainTopCinemaBar" x="4" y="0" height="20" width="430" style="style-focused-
                cinema-bar" />
    <rect name="mainLeftBorder" x="0" y="0" height="172" width="4" style="style-unfocused-
                cinema-bar" />
    <button name="btnGeneratePassPhrase" x="10" y="30" height="30" width="300" style="style-
                menu-black-button" onclick="call(GeneratePassPhrase)">Step 1 - Generate Pass
                Phrase</button>
    <text name="rs_pass_phrase_lbl" x="30" y="72" height="26" width="180" style="style-grey-
                text">Your Pass Phrase is:</text>
    <text name="rs_pass_phrase" x="220" y="72" height="26" width="130" style="style-white-
                text">$passPhrase</text>
```

```
        <button name="btnRegisterSettop" x="10" y="112" height="30" width="300" disabled="true"
                style="style-menu-black-button" onclick="call(RegisterSettop)">Step 2 - Register
                Settop</button>
        <rect name="mainBottomCinemaBar" x="0" y="166" height="6" width="434" style="style-
                unfocused-cinema-bar" />
            </container>
        <text name="rs_instructions" x="50" y="286" height="208" width="568" multiline="true"
                style="style-instructional-text">$step1Instructions</text>
- <form name="registerSettopForm" target="RegisterSettopServer/iphone/addPassPhrase.jsp"
                twowaytable-ref="registerSettopData" loadingbar="true"
                onsuccess="call(HandleSuccessfulRegisterSettopPost)"
                onfailure="call(HandleFailedRegisterSettopPost)">
        <item widget="@macAddressHidden" />
        <item widget="@passPhraseHidden" />
            </form>
        <hidden name="macAddressHidden" submit-name="mac" value="#client.uid" />
        <hidden name="passPhraseHidden" submit-name="passPhrase" value="$passPhrase" />
                    - <!--
                        setfocus(@main_window_container);
                            set(@btnRegisterSettop.disabled,
                true);
                    -->
- <sub name="AppStateChangeHandler">
    <action value="debug(In AppStateChangeHandler)" />
- <if>
    <test lhs="#client.event-property.new-state" expr="eq" rhs="3" />
        - <!--
            If entering running state
        -->
    <action value="debug(Initializing...); set($passPhrase, ''); set(@rs_instructions.text,
            $step1Instructions); setfocus(@btnRegisterSettop); set($alphaArray[0], A);
            set($alphaArray[1], B); set($alphaArray[2], C); set($alphaArray[3], D); set($alphaArray[4],
            E); set($alphaArray[5], F); set($alphaArray[6], G); set($alphaArray[7], H);
            set($alphaArray[8], I); set($alphaArray[9], J); set($alphaArray[10], K); set($alphaArray[11],
            L); set($alphaArray[12], M); set($alphaArray[13], N); set($alphaArray[14], O);
            set($alphaArray[15], P); set($alphaArray [16], Q); set($alphaArray[17], R);
            set($alphaArray[18], S); set($alphaArray [19], T); set($alphaArray[20], U);
            set($alphaArray[21], V); set($alphaArray[22], W); set($alphaArray[23], X);
            set($alphaArray[24], Y); set($alphaArray[25], Z)" />
        </if>
        </sub>
- <sub name="GeneratePassPhrase">
    <action value="debug(In GeneratePassPhrase); call(BuildRandomNumber);
            set(@btnRegisterSettop.disabled, false); setfocus(@btnRegisterSettop);
            set(@rs_instructions.text, $step2Instructions); redraw(@SocialRemote)" />
        </sub>
- <sub name="BuildRandomNumber">
    <action value="debug(In BuildRandomNumber); set($counter, 0); set($passPhrase,'')" />
- <loop>
- <if>
    <test lhs="$counter" expr="gt" rhs="5" />
    <break />
        </if>
    <action value="add($counter, 1); rand($intVar1, 1, 35)" />
- <if>
    <test lhs="$intVar1" expr="gt" rhs="26" />
        - <!--
            27 - 35 is for numeric values
        -->
    <action value="sub($intVar1, 26); stringconvert($alphaChar, $intVar1)" />
        </if>
- <else>
        - <!--
            1 - 26 - is for alpha values
        -->
    <action value="set($alphaChar, $alphaArray[$intVar1])" />
        </else>
    <action value="stringappend($passPhrase, $alphaChar)" />
        </loop>
        </sub>
- <sub name="RegisterSettop">
    <action value="debug(In RegisterSettop, submitting data); submit(@registerSettopForm)" />
        </sub>
- <sub name="HandleSuccessfulRegisterSettopPost">
    <action value="debug(in HandleSuccessfulRegisterSettopPost); set(@rs_instructions.text,
            $step3Instructions); redraw(@SocialRemote)" />
        </sub>
- <sub name="HandleFailedRegisterSettopPost">
    <action value="debug(in HandleFailedRegisterSettopPost); set(@rs_instructions.text,
```

```
        $failedPostMessage); redraw(@SocialRemote)" />
    </sub>

</mac>
```

The following is an example XML file for a video on demand viewer application:

```
- <mac xmlns:xsi="http://www.w3.org/2001/XMLSchema-instance"
        xsi:noNamespaceSchemaLocation="http://location/mac-3.1.xsd">
    <var name="vodLocator" type="locator" />
    <var name="vodTarget" type="string" length="200" />
                - <!--
                    VOD Icons
                        Pause       
                        Rewind      
                        FF          
                        Play        ► Large
                        Play        ▶
                        ON Demand   
                  -->
- <page x="14" y="0" style="style-transparent" onload="call(VodInit)"
        onerror="set(#client.event-property.default-canceled, 1);call(OnErrorHandler)"
        onvideostatechange="set(#client.event-property.default-canceled,
        1);call(OnVideoStateHandler);">
    <rect name="vodTrick" x="500" y="390" height="42" width="100" hidden="true"
        style="style-vod-trick" />
    <text name="onDemandLabel" x="514" y="396" height="30" width="30" hidden="true"
        style="style-vod-trick-label">☐</text>
    <text name="vodTrickLabel" x="558" y="396" height="30" width="38" hidden="true"
        style="style-vod-trick-label" />
                - <!--
                    <rect name="vodTrick" x="500" y="390" height="50" width="100"
        style="style-vod-trick"/>
                    <text name="onDemandLabel" x="10" y="10" height="30" width="30"
        style="style-vod-trick-label"></text>
                    <text name="vodTrickLabel" x="54" y="10" height="30" width="38"
        style="style-vod-trick-label"></text>
                    <container name="vodTrickContainer" x="500" y="390" height="50"
        width="100" hidden="false">
                            <rect name="vodTrick" x="500" y="390" height="50"
        width="100" style="style-vod-trick"/>
                            <text name="onDemandLabel" x="10" y="10" height="30"
        width="30" style="style-vod-trick-label"></text>
                            <text name="vodTrickLabel" x="54" y="10" height="30"
        width="38" style="style-vod-trick-label"></text>
                    </container>
                  -->
- <sub name="VodInit">
    <action value="debug(VodInit);" />
- <if>
    <test lhs="$vodTarget" expr="ne" rhs="" />
    <action value="set($vodLocator, $vodTarget); selectservice($vodLocator)" />
        </if>
- <else>
    <action value="load(main)" />
        </else>
        </sub>
- <sub name="OnErrorHandler">
    <action value="debug(in OnErrorHandler: VOD Error = #client.event-property.error-code);
        load(main)" />
        </sub>
- <sub name="OnVideoStateHandler">
    <action value="debug(In OnVideoStateHandler, Change = #client.event-property.video.change-
        type)" />
- <if>
    <test lhs="#client.event-property.video.change-type" rhs="end-of-stream" expr="eq" />
    <action value="videocontrol(stop, normal);" />
        </if>
- <elseif>
    <test lhs="#client.event-property.video.change-type" expr="eq" rhs="end-of-segment" />
    <action value="debug(PLAY VIDEO - end-of-segment)" />
        </elseif>
- <elseif>
```

```
              <test lhs="#client.event-property.video.change-type" expr="eq" rhs="end-of-skip" />
              <action value="debug(PLAY VIDEO - end-of-skip)" />
                  </elseif>
     - <elseif>
              <test lhs="#client.event-property.video.change-type" expr="eq" rhs="terminated" />
              <action value="debug(calling load Main due to VOD termination); call(HideTrickLabels);
                      load(main)" />
                  </elseif>
      - <elseif>
      - <or>
              <test lhs="#client.event-property.video.change-type" expr="eq" rhs="mode" />
              <test lhs="#client.event-property.video.change-type" expr="eq" rhs="rate" />
                  </or>
              <action value="debug(PLAY VIDEO - mode or rate change - rate = #client.event-
                      property.video.rate - mode = #client.event-property.video.mode);
                      call(HandleModeOrRateChange)" />
                  </elseif>
                  </sub>
     - <sub name="HandleModeOrRateChange">
              <action value="debug(in HandleModeOrRateChange)" />
     - <if>
              <test lhs="#client.event-property.video.rate" rhs="pause" expr="eq" />
              <action value="debug(rate = pause)" />
              <action value=");call(ShowTrickLabels)□set(@vodTrickLabel.text, " />
                  </if>
     - <elseif>
              <test lhs="#client.event-property.video.rate" rhs="normal" expr="eq" />
              <action value="debug(rate = normal)" />
              <action value="call(HideTrickLabels)" />
                  </elseif>
     - <elseif>
     - <and>
              <test lhs="#client.event-property.video.rate" rhs="fast1" expr="eq" />
              <test lhs="#client.event-property.video.mode" rhs="play-forward" expr="eq" />
                  </and>
              <action value="debug(mode = play-forward, rate = fast1)" />
              <action value=");call(ShowTrickLabels)□set(@vodTrickLabel.text, " />
                  </elseif>
     - <elseif>
     - <and>
              <test lhs="#client.event-property.video.rate" rhs="fast1" expr="eq" />
              <test lhs="#client.event-property.video.mode" rhs="play-reverse" expr="eq" />
                  </and>
              <action value="debug(mode = play-reverse, rate = fast1)" />
              <actionvalue=");call(ShowTrickLabels)□set(@vodTrickLabel.text, " />
                  </elseif>
     - <elseif>
              <test lhs="#client.event-property.video.mode" rhs="skip-forward" expr="eq" />
              <action value="debug(mode = skip-forward)" />
                  </elseif>
     - <elseif>
              <test lhs="#client.event-property.video.mode" rhs="skip-reverse" expr="eq" />
              <action value="debug(mode = skip-reverse)" />
                  </elseif>
     - <elseif>
              <test lhs="#client.event-property.video.mode" rhs="stop" expr="eq" />
              <action value="debug(mode = stop)" />
                  </elseif>
                  </sub>
     - <sub name="HandleRateChange">
              <action value="debug(in HandleRateChange)" />
     - <if>
              <test lhs="#client.event-property.video.rate" rhs="pause" expr="eq" />
              <action value="s);call(ShowTrickLabels)□et(@vodTrickLabel.text, " />
                  </if>
     - <elseif>
              <test lhs="#client.event-property.video.rate" rhs="normal" expr="eq" />
              <action value="call(HideTrickLabels)" />
                  </elseif>
     - <elseif>
              <test lhs="#client.event-property.video.rate" rhs="fast1" expr="eq" />
              <action value=");call(ShowTrickLabels)□set(@vodTrickLabel.text, " />
                  </elseif>
                  </sub>
     - <sub name="HandleModeChange">
              <action value="debug(in HandleModeChange)" />
     - <if>
              <test lhs="#client.event-property.video.mode" rhs="play-forward" expr="eq" />
              <action value="debug(play-forward)" />
```

-continued

```
                    - <!--
                                <action value="set(@vodTrickLabel.text,
                        );call(ShowTrickLabels)" />
                    -->
                </if>
        - <elseif>
                <test lhs="#client.event-property.video.mode" rhs="play-reverse" expr="eq" />
                <action value="debug(play-reverse)" />
                <action value=");call(ShowTrickLabels)□set(@vodTrickLabel.text, " />
                </elseif>
        - <elseif>
                <test lhs="#client.event-property.video.mode" rhs="skip-forward" expr="eq" />
                <action value="debug(skip-forward)" />
                </elseif>
        - <elseif>
                <test lhs="#client.event-property.video.mode" rhs="skip-reverse" expr="eq" />
                <action value="debug(skip-reverse)" />
                </elseif>
        - <elseif>
                <test lhs="#client.event-property.video.mode" rhs="stop" expr="eq" />
                <action value="debug(stop); call(HideTrickLabels)" />
                </elseif>
            </sub>
    - <sub name="HideTrickLabels">
    - <if>
            <test lhs="@vodTrick.hidden" rhs="false" expr="eq" />
            <action value="set(@vodTrick.hidden, true); set(@onDemandLabel.hidden, true);
                    set(@vodTrickLabel.hidden, true); redraw(vod-vwr)" />
            </if>
        </sub>
    - <sub name="ShowTrickLabels">
    - <if>
            <test lhs="@vodTrick.hidden" rhs="true" expr="eq" />
            <action value="set(@vodTrick.hidden, false); set(@onDemandLabel.hidden, false);
                    set(@vodTrickLabel.hidden, false); redraw(vod-vwr)" />
            </if>
        </sub>

</mac>
```

The following is an example UDP message that can be used as described above:

```
package com.comcastmediacenter.hits.axis.messaging.udp;
public class UdpMessage implements java.io.Serializable {
    private java.lang.String mac;
    private short appId;
    private int orgId;
    private int triggerId;
    private java.lang.String xml;
    private org.apache.axis.types.URI xmlURL;
    private java.lang.String schema;
    private org.apache.axis.types.URI schemaURL;
    public UdpMessage( ) {
    }
    public UdpMessage(
            java.lang.String mac,
            short appId,
            int orgId,
            int triggerId,
            java.lang.String xml,
            org.apache.axis.types.URI xmlURL,
            java.lang.String schema,
            org.apache.axis.types.URI schemaURL) {
        this.mac = mac;
        this.appId = appId;
        this.orgId = orgId;
        this.triggerId = triggerId;
        this.xml = xml;
        this.xmlURL = xmlURL;
        this.schema = schema;
        this.schemaURL = schemaURL;
    }
    /**
     * Gets the mac value for this UdpMessage.
     *
```

```
 * @return mac
 */
public java.lang.String getMac( ) {
    return mac;
}
/**
 * Sets the mac value for this UdpMessage.
 *
 * @param mac
 */
public void setMac(java.lang.String mac) {
    this.mac = mac;
}
/**
 * Gets the appId value for this UdpMessage.
 *
 * @return appId
 */
public short getAppId( ) {
    return appId;
}
/**
 * Sets the appId value for this UdpMessage.
 *
 * @param appId
 */
public void setAppId(short appId) {
    this.appId = appId;
}
/**
 * Gets the orgId value for this UdpMessage.
 *
 * @return orgId
 */
public int getOrgId( ) {
    return orgId;
}
/**
 * Sets the orgId value for this UdpMessage.
 *
 * @param orgId
 */
public void setOrgId(int orgId) {
    this.orgId = orgId;
}
/**
 * Gets the triggerId value for this UdpMessage.
 *
 * @return triggerId
 */
public int getTriggerId( ) {
    return triggerId;
}
/**
 * Sets the triggerId value for this UdpMessage.
 *
 * @param triggerId
 */
public void setTriggerId(int triggerId) {
    this.triggerId = triggerId;
}
/**
 * Gets the xml value for this UdpMessage.
 *
 * @return xml
 */
public java.lang.String getXml( ) {
    return xml;
}
/**
 * Sets the xml value for this UdpMessage.
 *
 * @param xml
 */
public void setXml(java.lang.String xml) {
    this.xml = xml;
}
/**
 * Gets the xmlURL value for this UdpMessage.
```

```
 *
 * @return xmlURL
 */
public org.apache.axis.types.URI getXmlURL( ) {
    return xmlURL;
}
/**
 * Sets the xmlURL value for this UdpMessage.
 *
 * @param xmlURL
 */
public void setXmlURL(org.apache.axis.types.URI xmlURL) {
    this.xmlURL = xmlURL;
}
/**
 * Gets the schema value for this UdpMessage.
 *
 * @return schema
 */
public java.lang.String getSchema( ) {
    return schema;
}
/**
 * Sets the schema value for this UdpMessage.
 *
 * @param schema
 */
public void setSchema(java.lang.String schema) {
    this.schema = schema;
}
/**
 * Gets the schemaURL value for this UdpMessage.
 *
 * @return schemaURL
 */
public org.apache.axis.types.URI getSchemaURL( ) {
    return schemaURL;
}
/**
 * Sets the schemaURL value for this UdpMessage.
 *
 * @param schemaURL
 */
public void setSchemaURL(org.apache.axis.types.URI schemaURL) {
    this.schemaURL = schemaURL;
}
private java.lang.Object __equalsCalc = null;
public synchronized boolean equals(java.lang.Object obj) {
    if (!(obj instanceof UdpMessage)) return false;
    UdpMessage other = (UdpMessage) obj;
    if (obj == null) return false;
    if (this == obj) return true;
    if (__equalsCalc != null) {
        return (__equalsCalc == obj);
    }
    __equalsCalc = obj;
    boolean _equals;
    _equals = true &&
        ((this.mac==null && other.getMac( )==null) ||
            (this.mac!=null &&
            this.mac.equals(other.getMac( )))) &&
        this.appId == other.getAppId( ) &&
        this.orgId == other.getOrgId( ) &&
        this.triggerId == other.getTriggerId( ) &&
        ((this.xml==null && other.getXml( )==null) ||
            (this.xml!=null &&
            this.xml.equals(other.getXml( )))) &&
        ((this.xmlURL==null && other.getXmlURL( )==null) ||
            (this.xmlURL!=null &&
            this.xmlURL.equals(other.getXmlURL( )))) &&
        ((this.schema==null && other.getSchema( )==null) ||
            (this.schema!=null &&
            this.schema.equals(other.getSchema( )))) &&
        ((this.schemaURL==null && other.getSchemaURL( )==null) ||
            (this.schemaURL!=null &&
            this.schemaURL.equals(other.getSchemaURL( ))));
    __equalsCalc = null;
    return _equals;
}
```

```
            private boolean ___hashCodeCalc = false;
            public synchronized int hashCode( ) {
                    if (___hashCodeCalc) {
                            return 0;
                    }
                    ___hashCodeCalc = true;
                    int _hashCode = 1;
                    if (getMac( ) != null) {
                            _hashCode += getMac( ).hashCode( );
                    }
                    _hashCode += getAppId( );
                    _hashCode += getOrgId( );
                    _hashCode += getTriggerId( );
                    if (getXml( ) != null) {
                            _hashCode += getXml( ).hashCode( );
                    }
                    if (getXmlURL( ) != null) {
                            _hashCode += getXmlURL( ).hashCode( );
                    }
                    if (getSchema( ) != null) {
                            _hashCode += getSchema( ).hashCode( );
                    }
                    if (getSchemaURL( ) != null) {
                            _hashCode += getSchemaURL( ).hashCode( );
                    }
                    ___hashCodeCalc = false;
                    return _hashCode;
            }
            // Type metadata
            private static org.apache.axis.description.TypeDesc typeDesc =
                    new org.apache.axis.description.TypeDesc(UdpMessage.class, true);
            static {
                    typeDesc.setXmlType(new javax.xml.namespace.QName("http://location/udp",
">UdpMessage"));
                    org.apache.axis.description.ElementDesc  elemField  =  new
org.apache.axis.description.ElementDesc( );
                    elemField.setFieldName("mac");
                    elemField.setXmlName(new javax.xml.namespace.QName("http://location/udp",
"mac"));
                    elemField.setXmlType(new
javax.xml.namespace.QName("http://www.w3.org/2001/XMLSchema", "string"));
                    elemField.setNillable(false);
                    typeDesc.addFieldDesc(elemField);
                    elemField = new org.apache.axis.description.ElementDesc( );
                    elemField.setFieldName("appId");
                    elemField.setXmlName(new javax.xml.namespace.QName("http://location/udp",
"appId"));
                    elemField.setXmlType(new
javax.xml.namespace.QName("http://www.w3.org/2001/XMLSchema", "short"));
                    elemField.setNillable(false);
                    typeDesc.addFieldDesc(elemField);
                    elemField = new org.apache.axis.description.ElementDesc( );
                    elemField.setFieldName("orgId");
                    elemField.setXmlName(new javax.xml.namespace.QName("http://location/udp",
"orgId"));
                    elemField.setXmlType(new
javax.xml.namespace.QName("http://www.w3.org/2001/XMLSchema", "int"));
                    elemField.setNillable(false);
                    typeDesc.addFieldDesc(elemField);
                    elemField = new org.apache.axis.description.ElementDesc( );
                    elemField.setFieldName("triggerId");
                    elemField.setXmlName(new javax.xml.namespace.QName("http://location/udp",
"triggerId"));
                    elemField.setXmlType(new
javax.xml.namespace.QName("http://www.w3.org/2001/XMLSchema", "int"));
                    elemField.setNillable(false);
                    typeDesc.addFieldDesc(elemField);
                    elemField = new org.apache.axis.description.ElementDesc( );
                    elemField.setFieldName("xml");
                    elemField.setXmlName(new javax.xml.namespace.QName("http://location/udp",
"xml"));
                    elemField.setXmlType(new
javax.xml.namespace.QName("http://www.w3.org/2001/XMLSchema", "string"));
                    elemField.setMinOccurs(0);
                    elemField.setNillable(false);
                    typeDesc.addFieldDesc(elemField);
                    elemField = new org.apache.axis.description.ElementDesc( );
                    elemField.setFieldName("xmlURL");
                    elemField.setXmlName(new javax.xml.namespace.QName("http://location/udp",
```

-continued

```
"xmlURL"));
            elemField.setXmlType(new
javax.xml.namespace.QName("http://www.w3.org/2001/XMLSchema", "anyURI"));
            elemField.setMinOccurs(0);
            elemField.setNillable(false);
            typeDesc.addFieldDesc(elemField);
            elemField = new org.apache.axis.description.ElementDesc( );
            elemField.setFieldName("schema");
            elemField.setXmlName(new javax.xml.namespace.QName("http://location/udp",
"schema"));
            elemField.setXmlType(new
javax.xml.namespace.QName("http://www.w3.org/2001/XMLSchema", "string"));
            elemField.setMinOccurs(0);
            elemField.setNillable(false);
            typeDesc.addFieldDesc(elemField);
            elemField = new org.apache.axis.description.ElementDesc( );
            elemField.setFieldName("schemaURL");
            elemField.setXmlName(new javax.xml.namespace.QName("http://location/udp",
"schemaURL"));
            elemField.setXmlType(new
javax.xml.namespace.QName("http://www.w3.org/2001/XMLSchema", "anyURI"));
            elemField.setMinOccurs(0);
            elemField.setNillable(false);
            typeDesc.addFieldDesc(elemField);
        }
        /**
         * Return type metadata object
         */
        public static org.apache.axis.description.TypeDesc getTypeDesc( ) {
            return typeDesc;
        }
        /**
         * Get Custom Serializer
         */
        public static org.apache.axis.encoding.Serializer getSerializer(
               java.lang.String mechType,
               java.lang.Class _javaType,
               javax.xml.namespace.QName _xmlType) {
            return
                new org.apache.axis.encoding.ser.BeanSerializer(
                    _javaType, _xmlType, typeDesc);
        }
        /**
         * Get Custom Deserializer
         */
        public static org.apache.axis.encoding.Deserializer getDeserializer(
               java.lang.String mechType,
               java.lang.Class _javaType,
               javax.xml.namespace.QName _xmlType) {
            return
                new org.apache.axis.encoding.ser.BeanDeserializer(
                    _javaType, _xmlType, typeDesc);
        }
    }
```

The invention claimed is:

1. A method comprising:
receiving, from a wireless device associated with a content access device located at a premises, a first remote control command, wherein the first remote control command is formatted based on a first format and wherein the first remote control command comprises a first command value;
sending, to a computing device located remotely from the premises, the first remote control command;
receiving, from the computing device, a second remote control command, wherein the second remote control command is formatted based on a second format different from the first format and wherein the second remote control command comprises a second command value; and
sending, to the content access device, the second remote control command.

2. The method of claim 1, wherein the second remote control command comprises a digital video recorder (DVR) command that is configured to cause the content access device to output a content asset corresponding to the second command value.

3. The method of claim 2, further comprising:
redirecting, to the wireless device, the content asset.

4. The method of claim 1, wherein:
the second remote control command comprises a digital video recorder (DVR) record command;
the DVR record command is configured to cause the content access device to record a content asset corresponding to the second command value; and
the second command value comprises at least one of a source identifier or a start time.

5. The method of claim 1, wherein the second remote control command is a channel tune command and the second command value is a channel source identifier.

6. The method of claim 1, wherein the second remote control command is a video on demand (VOD) tuning command and the second command value is at least one of a provider identifier or an asset identifier.

7. The method of claim 1, wherein the second remote control command comprises at least one of a message generation command or an application execution command.

8. The method of claim 1, wherein the content access device comprises at least one of a set-top box (STB), a digital video recorder (DVR), or a display device.

9. The method of claim 1, wherein the second format is Enhanced television Binary Interchange Format (EBIF).

10. An apparatus comprising:
one or more processors; and
memory storing instructions that, when executed by the one or more processors, cause the apparatus to:
receive, from a wireless device associated with a content access device located at a premises, a first remote control command, wherein the first remote control command is formatted based on a first format and wherein the first remote control command comprises a first command value;
send, to a computing device located remotely from the premises, the first remote control command;
receive, from the computing device, a second remote control command, wherein the second remote control command is formatted based on a second format different from the first format and wherein the second remote control command comprises a second command value; and
send, to the content access device, the second remote control command.

11. The apparatus of claim 10, wherein the second remote control command comprises a digital video recorder (DVR) command that is configured to cause the content access device to output a content asset corresponding to the second command value.

12. The apparatus of claim 11, wherein the instructions, when executed by the one or more processors, further cause the apparatus to:
redirect, to the wireless device, the content asset.

13. The apparatus of claim 10, wherein:
the second remote control command comprises a digital video recorder (DVR) record command;
the DVR record command is configured to cause the content access device to record a content asset corresponding to the second command value; and
the second command value comprises at least one of a source identifier or a start time.

14. The apparatus of claim 10, wherein the second remote control command is a channel tune command and the second command value is a channel source identifier.

15. The apparatus of claim 10, wherein the second remote control command is a video on demand (VOD) tuning command and the second command value is at least one of a provider identifier or an asset identifier.

16. The apparatus of claim 10, wherein the second remote control command comprises at least one of a message generation command or an application execution command.

17. The apparatus of claim 10, wherein the content access device comprises at least one of a set-top box (STB), a digital video recorder (DVR), or a display device.

18. The apparatus of claim 10, wherein the second format is Enhanced television Binary Interchange Format (EBIF).

19. A non-transitory computer-readable medium storing instructions that, when executed, cause:
receiving, from a wireless device associated with a content access device located at a premises, a first remote control command, wherein the first remote control command is formatted based on a first format and wherein the first remote control command comprises a first command value;
sending, to a computing device located remotely from the premises, the first remote control command;
receiving, from the computing device, a second remote control command, wherein the second remote control command is formatted based on a second format different from the first format and wherein the second remote control command comprises a second command value; and
sending, to the content access device, the second remote control command.

20. The non-transitory computer-readable medium of claim 19, Wherein the second remote control command comprises a digital video recorder (DVR) command that is configured to cause the content access device to output a content asset corresponding to the second command value.

21. The non-transitory computer-readable medium of claim 20, wherein the instructions, when executed, further cause:
redirecting, to the wireless device, the content asset.

22. The non-transitory computer-readable medium of claim 19, wherein:
the second remote control command comprises a digital video recorder (DVR) record command;
the DVR record command is configured to cause the content access device to record a content asset corresponding to the second command value; and
the second command value comprises at least one of a source identifier or a start time.

23. The non-transitory computer-readable medium of claim 19, wherein the second remote control command is a channel tune command and the second command value is a channel source identifier.

24. The non-transitory computer-readable medium of claim 19, wherein the second remote control command is a video on demand (VOD) tuning command and the second command value is at least one of a provider identifier or an asset identifier.

25. The non-transitory computer-readable medium of claim 19, wherein the second remote control command comprises at least one of a message generation command or an application execution command.

26. The non-transitory computer-readable medium of claim 19, wherein the content access device comprises at least one of a set-top box (STB), a digital video recorder (DVR), or a display device.

27. The non-transitory computer-readable medium of claim 19, wherein the second format is Enhanced television Binary Interchange Format (EBIF).

28. A system comprising:
a gateway located at a premises, wherein the gateway is configured to:
receive, from a wireless device, a first remote control command, wherein the first remote control command is formatted based on a first format and wherein the first remote control command comprises a first command value;
send, to a computing device located remotely from the premises, the first remote control command;
receive, from the computing device, a second remote control command, wherein the second remote control command is formatted based on a second format different from the first format and wherein the second remote control command comprises a second command value; and send the second remote control command; and a content access device, located at the premises, configured to receive the second remote control command.

29. The system of claim 28, wherein the second remote control command comprises a digital video recorder (DVR) command that is configured to cause the content access device to output a content asset corresponding to the second command value.

30. The system of claim 29, wherein the gateway is further configured to:

redirect, to the wireless device, the content asset.

31. The system of claim 28, wherein:

the second remote control command comprises a digital video recorder (DVR) record command;

the DVR record command is configured to cause the content access device to record a content asset corresponding to the second command value; and the second command value comprises at least one of a source identifier or a start time.

32. The system of claim 28, wherein the second remote control command is a channel tune command and the second command value is a channel source identifier.

33. The system of claim 28, wherein the second remote control command is a video on demand (VOD) tuning command and the second command value is at least one of a provider identifier or an asset identifier.

34. The system of claim 28, wherein the second remote control command comprises at least one of a message generation command or an application execution command.

35. The system of claim 28, wherein the content access device comprises at least one of a set-top box (STB), a digital video recorder (DVR), or a display device.

36. The system of claim 28, wherein the second format is Enhanced television Binary Interchange Format (EBIF).

\* \* \* \* \*

UNITED STATES PATENT AND TRADEMARK OFFICE
CERTIFICATE OF CORRECTION

| | |
|---|---|
| PATENT NO. | : 11,109,091 B2 |
| APPLICATION NO. | : 16/387030 |
| DATED | : August 31, 2021 |
| INVENTOR(S) | : Michael D. McMahon et al. |

It is certified that error appears in the above-identified patent and that said Letters Patent is hereby corrected as shown below:

In the Specification

Detailed Description, Column 7, Line 63:
Please delete ““Z12SP4”),” and insert --“Zl2SP4”),--

Detailed Description, Column 8, Line 10:
Delete "phassphrase" and insert --passphrase--

In the Claims

Claim 20, Column 42, Line 15:
Delete "Wherein" and insert --wherein--

Signed and Sealed this
Twenty-fifth Day of April, 2023

Katherine Kelly Vidal
*Director of the United States Patent and Trademark Office*